(12) United States Patent  
Finn

(10) Patent No.: US 7,515,535 B2  
(45) Date of Patent: Apr. 7, 2009

(54) TECHNIQUE FOR EFFICIENTLY MANAGING BANDWIDTH FOR MULTIPOINT-TO-MULTIPOINT SERVICES IN A PROVIDER NETWORK

(75) Inventor: Norman W. Finn, Livermore, CA (US)

(73) Assignee: Cisco Technology, Inc., San Jose, CA (US)

( * ) Notice: Subject to any disclaimer, the term of this patent is extended or adjusted under 35 U.S.C. 154(b) by 504 days.

(21) Appl. No.: 11/431,429

(22) Filed: May 10, 2006

(65) Prior Publication Data

US 2007/0263640 A1    Nov. 15, 2007

(51) Int. Cl.
- *G01R 31/08* (2006.01)
- *H04Q 7/24* (2006.01)
- *H04L 12/28* (2006.01)
- *H04J 3/16* (2006.01)

(52) U.S. Cl. .............. 370/230; 370/235; 370/338; 370/401; 370/468

(58) Field of Classification Search ............... None
See application file for complete search history.

(56) References Cited

U.S. PATENT DOCUMENTS

| | | | |
|---|---|---|---|
| 5,394,402 A | 2/1995 | Ross | |
| 5,742,604 A | 4/1998 | Edsall | |
| 6,032,194 A | 2/2000 | Gai et al. | |
| 6,188,694 B1 | 2/2001 | Fine et al. | |
| 6,202,114 B1 | 3/2001 | Dutt et al. | |
| 6,219,739 B1 | 4/2001 | Dutt et al. | |
| 6,388,995 B1 | 5/2002 | Gai et al. | |
| 6,515,969 B1 | 2/2003 | Smith | |
| 6,529,498 B1 | 3/2003 | Cheng | |
| 6,628,624 B1 | 9/2003 | Mahajan et al. | |

(Continued)

OTHER PUBLICATIONS

United States Patent Application Serial No., entitled A Technique for Efficiently Managing Bandwidth Registration for Multiple Spanning Tree Options, by Norman W. Finn, on May 10, 2006.

(Continued)

*Primary Examiner*—Hassan Kizou  
*Assistant Examiner*—Brandon Renner  
(74) *Attorney, Agent, or Firm*—Cesari and McKenna LLP

(57) ABSTRACT

A technique efficiently manages bandwidth (BW) for multipoint-to-multipoint (MP2MP) services in a provider network of a computer network. According to the novel technique, each bridge having a user-network interface (UNI) port of an MP2MP service generates a registration for the service that carries maximum BW values for each port direction (e.g., for each {service, priority, color} triple), e.g., as defined by a Service Level Agreement (SLA). The registrations are advertised among neighboring bridges throughout the network toward other UNI ports of the MP2MP service. As each bridge receives registrations from each neighboring bridge (or from the UNI port), the bridge advertises registered BW values pertaining to a particular direction on a particular one of its ports that correspond to the sum of the BW values for that direction received on all of the other ports of the bridge, up to a maximum BW value (e.g., configured or physical) for the particular port. The actual BW required for allocation on an active port for each direction is the lower of either the registered value advertised from the port in a particular direction or the registered value received at the port in the opposite direction.

19 Claims, 11 Drawing Sheets

U.S. PATENT DOCUMENTS

| | | | |
|---|---|---|---|
| 6,801,506 | B1 | 10/2004 | Dey |
| 6,813,250 | B1 | 11/2004 | Fine et al. |
| 6,898,189 | B1 | 5/2005 | Di Benedetto et al. |
| 6,934,262 | B1 | 8/2005 | Lau et al. |
| 6,937,576 | B1 | 8/2005 | Di Benedetto et al. |
| 6,944,130 | B1 | 9/2005 | Chu et al. |
| 7,433,307 | B2* | 10/2008 | Hooper et al. .............. 370/231 |
| 2003/0142635 | A1* | 7/2003 | Roher et al. ................ 370/260 |
| 2005/0063307 | A1* | 3/2005 | Samuels et al. ............. 370/235 |
| 2006/0153234 | A1* | 7/2006 | Iwamura et al. ............. 370/468 |
| 2007/0041384 | A1* | 2/2007 | Das et al. ................ 370/395.4 |

OTHER PUBLICATIONS

IEEE P802.1ak/D5.1, Draft Standard for Local and Metropolitan Area Networks, Virtual Bridged Local Area Networks—Amendment 07: Multiple Registration Protocol, IEEE, Mar. 30, 2006, pp. 1-107.

IEEE Std. 802.1D, 1998 Edition, Information Technology—Telecommunications and Information Exchange Between Systems—Local and Metropolitan Area Networks—Common Specifications—Part 3: Media Access Control (MAC) Bridges, IEEE, 1998, pp. 1-355.

IEEE Std. 802.1D—2004, IEEE Standard for Local and Metropolitan Area Networks—Media Access Control (MAC) Bridges, IEEE, Jun. 2004, pp. 1-269.

IEEE Std. P802.1Q-Rev/D.0, Draft Standard for Local and Metropolitan Area Networks—Virtual Bridged Local Area Networks—Revision, IEEE Sep. 2005.

Perlman, R. et al., [rbridge] How many Spanning Trees?, (internet newsgroup posting), (http://www.postel.org.pipermail/rbridge/2005-June/000352.html), Jun. 28, 2005, pp. 1-3.

Seaman, Mick, Multiple Symmetric Spanning Trees, Revision 0.3, Mar. 9, 2005. pp. 1-4/

Internetworking Technologies Handbook No. 1-58705-001-3, Chapter 23 entitled Transparent Bridging, Cisco Press, pp. 23-1 through 23-8.

Virtual Bridged Local Area Networks; IEEE Std 802.1Q, 2003 Edition, IEEE, pp. 183-184 and 209.

U.S. Appl. No. 11/182,564, entitled Methods and Devices for Improving the Multiple Spanning Tree Protocol, by Normal Finn, on Jul. 14, 2005.

* cited by examiner

TECHNIQUE FOR EFFICIENTLY MANAGING BANDWIDTH FOR MULTIPOINT-TO-MULTIPOINT SERVICES IN A PROVIDER NETWORK

CROSS-REFERENCE TO RELATED APPLICATIONS

The present invention is related to commonly-owned copending U.S. application Ser. No. 11/431,428, entitled A TECHNIQUE FOR EFFICIENTLY MANAGING BANDWIDTH REGISTRATION FOR MULTIPLE SPANNING TREE OPTIONS, filed by Finn on even date herewith, the contents of which are incorporated by reference in its entirety.

BACKGROUND OF THE INVENTION

1. Field of the Invention

The present invention relates to computer networks and, more particularly, to efficiently managing bandwidth (BW) for multipoint-to-multipoint (MP2MP) services in a provider network of a computer network.

2. Background Information

Many organizations, including businesses, governments and educational institutions, utilize computer networks so that employees and others may share and exchange information and/or resources. A computer network typically comprises a plurality of entities interconnected by means of one or more communications media. An entity may consist of any device, such as a computer, that "sources" (i.e., transmits) or "sinks" (i.e., receives) data frames over the communications media. A common type of computer network is a local area network ("LAN") which typically refers to a privately owned network within a single building or campus. LANs typically employ a data communication protocol (LAN standard), such as Ethernet, or a wireless protocol, that defines the functions performed by data link and physical layers of a communications architecture (i.e., a protocol stack).

One or more intermediate network devices are often used to couple LANs together and allow the corresponding entities to exchange information. For example, a bridge may be used to provide a "switching" function between two or more LANs or end stations. Typically, the bridge is a computer and includes a plurality of ports that are coupled via LANs either to other bridges, or to end stations such as routers or host computers. Ports used to couple bridges to each other are generally referred to as a trunk ports, whereas ports used to couple bridges to end stations are generally referred to as access ports. The bridging function includes receiving data from a sending entity at a source port and transferring that data to at least one destination port for forwarding to one or more receiving entities.

Spanning Tree Algorithm

Most computer networks include redundant communications paths so that a failure of any given link does not isolate any portion of the network. Such networks are typically referred to as meshed or partially meshed networks. The existence of redundant links, however, may cause the formation of circuitous paths or "loops" within the network. Loops are highly undesirable because data frames may traverse the loops indefinitely.

Furthermore, some devices, such as bridges or switches, replicate frames whose destination is not known resulting in a proliferation of data frames along loops. The resulting traffic can overwhelm the network. Other intermediate devices, such as routers, that operate at higher layers within the protocol stack, such as the Internetwork Layer of the Transmission Control Protocol/Internet Protocol ("TCP/IP") reference model, deliver data frames and learn the addresses of entities on the network differently than most bridges or switches, such that routers are generally not susceptible to sustained looping problems.

To avoid the formation of loops, most bridges and switches execute a spanning tree protocol which allows them to calculate an active network topology that is loop-free (i.e., a tree) and yet connects every pair of LANs within the network (i.e., the tree is spanning). The IEEE promulgated a standard (IEEE Std. 802.1D-1998™) that defines a spanning tree protocol to be executed by 802.1 D compatible devices. In general, by executing the 802.1D spanning tree protocol, bridges elect a single bridge within the bridged network to be the "Root Bridge". The 802.1D standard takes advantage of the fact that each bridge has a unique numerical identifier (bridge ID) by specifying that the Root Bridge is the bridge with the lowest bridge ID. In addition, for each LAN coupled to any bridge, exactly one port (the "Designated Port") on one bridge (the "Designated Bridge") is elected. The Designated Bridge is typically the one closest to the Root Bridge. All ports on the Root Bridge are Designated Ports, and the Root Bridge is the Designated Bridge on all the LANs to which it has ports.

Each non-Root Bridge also selects one port from among its non-Designated Ports (its "Root Port") which gives the lowest cost path to the Root Bridge. The Root Ports and Designated Ports are selected for inclusion in the active topology and are placed in a forwarding state so that data frames may be forwarded to and from these ports and thus onto the LANs interconnecting the bridges and end stations of the network. Ports not included within the active topology are placed in a blocking state. When a port is in the blocking state, data frames will not be forwarded to or received from the port. A network administrator may also exclude a port from the spanning tree by placing it in a disabled state.

To obtain the information necessary to run the spanning tree protocol, bridges exchange special messages called configuration bridge protocol data unit (BPDU) messages or simply BPDUs. BPDUs carry information, such as assumed root and lowest root path cost, used in computing the active topology. More specifically, upon start-up, each bridge initially assumes itself to be the Root Bridge and transmits BPDUs accordingly. Upon receipt of a BPDU from a neighboring device, its contents are examined and compared with similar information (e.g., assumed root and lowest root path cost) stored by the receiving bridge in memory. If the information from the received BPDU is "better" than the stored information, the bridge adopts the better information and uses it in the BPDUs that it sends (adding the cost associated with the receiving port to the root path cost) from its ports, other than the port on which the "better" information was received. Although BPDUs are not forwarded by bridges, the identifier of the Root Bridge is eventually propagated to and adopted by all bridges as described above, allowing them to select their Root Port and any Designated Port(s).

In order to adapt the active topology to changes and failures, the Root Bridge periodically (e.g., every hello time) transmits BPDUs. In response to receiving BPDUs on their Root Ports, bridges transmit their own BPDUs from their Designated Ports, if any. Thus, BPDUs are periodically propagated throughout the bridged network, confirming the active topology. As BPDU information is updated and/or timed-out and the active topology is re-calculated, ports may transition from the blocking state to the forwarding state and vice versa. That is, as a result of new BPDU information, a previously blocked port may learn that it should be in the forwarding state (e.g., it is now the Root Port or a Designated Port).

Virtual Local Area Networks

A computer network may also be segmented into a series of logical networks. For example, U.S. Pat. No. 5,394,402, issued Feb. 28, 1995 to Ross (the "'402 Patent"), discloses an arrangement for associating any port of a switch with any particular network segment. Specifically, according to the '402 patent, any number of physical ports of a particular switch may be associated with any number of groups within the switch by using a virtual local area network (VLAN) arrangement that virtually associates the port with a particular VLAN designation. More specifically, the switch or hub associates VLAN designations with its ports and further associates those VLAN designations with messages transmitted from any of the ports to which the VLAN designation has been assigned.

The VLAN designation for each port is stored in a memory portion of the switch such that every time a message is received on a given access port the VLAN designation for that port is associated with the message. Association is accomplished by a flow processing element which looks up the VLAN designation in the memory portion based on the particular access port at which the message was received. In many cases, it may be desirable to interconnect a plurality of these switches in order to extend the VLAN associations of ports in the network. Those entities having the same VLAN designation function as if they are all part of the same LAN. VLAN-configured bridges are specifically configured to prevent message exchanges between parts of the network having different VLAN designations in order to preserve the boundaries of each VLAN. Nonetheless, intermediate network devices operating above L2, such as routers, can relay messages between different VLAN segments.

In addition to the '402 patent, the IEEE promulgated the 802.1Q specification standard for Virtual Bridged Local Area Networks. To preserve VLAN associations of messages transported across trunks or links in VLAN-aware networks, both Ross and the IEEE Std. 802.1Q-2005 specification standard disclose appending a VLAN identifier (VID) field to the corresponding frames. In addition, U.S. Pat. No. 5,742,604 to Edsall et al. (the "'604 patent"), which is commonly owned with the present application, discloses an Interswitch Link (ISL) encapsulation mechanism for efficiently transporting packets or frames, including VLAN-modified frames, between switches while maintaining the VLAN association of the frames. In particular, an ISL link, which may utilize the Fast Ethernet standard, connects ISL interface circuitry disposed at each switch. The transmitting ISL circuitry encapsulates the frame being transported within an ISL header and ISL error detection information, while the ISL receiving circuitry strips off this information and recovers the original frame.

Multiple Spanning Tree Protocol

Within the IEEE Std. 802.1Q-2005, the IEEE also included a specification standard for a Spanning Tree Protocol that is specifically designed for use with networks that support VLANs. The Multiple Spanning Tree Protocol (MSTP), which is described in the IEEE Std. 802.1Q-2005, organizes a bridged network into regions. Within each region, MSTP establishes an Internal Spanning Tree (IST) which provides connectivity to all bridges within the respective region and to the ISTs established within other regions. The IST established within each MSTP Region also provides connectivity to the one Common Spanning Tree (CST) established outside of the MSTP regions by IEEE Std. 802.1Q-2005 compatible bridges running STP or RSTP. The IST of a given MST Region receives and sends BPDUs to the CST. Accordingly, all bridges of the bridged network are connected by a single Common and Internal Spanning Tree (CIST). From the point of view of the legacy or IEEE Std. 802.1Q-2005 bridges, moreover, each MST Region appears as a single virtual bridge on the CST.

Within each MST Region, the MSTP compatible bridges establish a plurality of active topologies, each of which is called a Multiple Spanning Tree Instance (MSTI). The MSTP bridges also assign or map each VLAN to one and only one of the MSTIs. Because VLANs may be assigned to different MSTIs, frames associated with different VLANs can take different paths through an MSTP Region. The bridges may, but typically do not, compute a separate topology for every single VLAN, thereby conserving processor and memory resources. Each MSTI is basically a simple RSTP instance that exists only inside the respective Region, and the MSTIs do not interact outside of the Region.

MSTP, like the other spanning tree protocols, uses BPDUs to establish the ISTs and MSTIs as well as to define the boundaries of the different MSTP Regions. The bridges do not send separate BPDUs for each MSTI. Instead, every MSTP BPDU carries the information needed to compute the active topology for all of the MSTIs defined within the respective Region. Each MSTI, moreover, has a corresponding Identifier (ID) and the MSTI IDs are encoded into the bridge IDs. That is, each bridge has a unique ID, as described above, and this ID is made up of a fixed portion and a settable portion. With MSTP, the settable portion of a bridge's ID is further organized to include both a settable priority component and a system ID extension. The system ID extension corresponds to the CIST or one of the MSTI IDs. The MSTP compatible bridges within a given Region will thus have a different bridge ID for the CIST and each MSTI. For a given MSTI, the bridge having the lowest bridge ID for that instance is elected the root. Thus, an MSTP compatible bridge may be the root for one MSTI but not another within a given MSTP Region.

Each bridge running MSTP also has a single MST Configuration Identifier (ID) that consists of three attributes: an alphanumeric configuration name, a revision level and a VLAN mapping table that associates each of the potential 4096 VLANs to a corresponding MSTI. Each bridge, moreover loads its MST Configuration ID into the BPDUs sourced by the bridge. Because bridges only need to know whether or not they are in the same MST Region, they do not propagate the actual VLAN to MSTI tables in their BPDUs. Instead, the MST BPDUs carry only a digest of the VLAN to MSTI table or mappings. The digest is generated by applying the well-known MD-5 algorithm to the VLAN to MSTI table. When a bridge receives an MST BPDU, it extracts the MST Configuration ID contained therein, including the digest, and compares it with its own MST Configuration ID to determine whether it is in the same MST Region as the bridge that sent the MST BPDU. If the two MST Configuration IDs are the same, then the two bridges are in the same MST Region. If, however, the two MST Configuration IDs have at least one non-matching attribute, i.e., either different configuration names, different revision levels and/or different computed digests, then the bridge that received the BPDU concludes that it is in a different MST Region than the bridge that sourced the BPDU. A port of an MST bridge, moreover, is considered to be at the boundary of an MST Region if the Designated Bridge is in a different MST Region or if the port receives legacy BPDUs.

Registration Protocols

IEEE Std. 802.1p (now incorporated within IEEE 802.1D-2004) outlines the implementation of the Generic Attribute Registration Protocol (GARP) and related GARP applications which allow end stations and bridges to exchange membership information in a generic manner. In particular, GARP, as defined by IEEE 802.1p, "provides a generic attribute dissemination capability that is used by participants in GARP Applications (GARP Participants) to register and de-register attribute values with other GARP Participants within a Bridged LAN." One application of GARP defined in IEEE 802.1p is the GARP Multicast Registration Protocol (GMRP), which allows GARP participants to join and leave multicast MAC (Media Access Control) address groups. The participant (e.g., an end station) who wishes to join a particular group registers with another GARP participant (e.g., a bridge) that is accepting registrations. This GARP participant (bridge) then applies for membership on behalf of the original participant (end station), which is propagated throughout the network. The information propagated by GMRP generally comprises the multicast MAC address. Another GARP application defined in IEEE 802.1p is the GARP VLAN Registration Protocol (GVRP). GVRP allows a participant to join and leave particular VLANs in a similar manner as GMRP, but involving VLAN membership information, e.g., VLAN IDs (VIDs), as defined in IEEE 802.1Q.

Generally, a GARP participant is responsible for handling GARP state machines and BPDU distribution. A participant in a multiport device (e.g., bridge/switch) that receives a registration for a particular attribute on a port declares (advertises) the attribute through the applicants on all of the other ports participating in GARP. The mechanism for propagating this information from one GARP participant to another within the same device is called GARP Information Propagation (GIP). A GIP context refers to the group of GARP participants belonging to a GIP. For each GIP context, there exists one GARP participant for each GARP application that is enabled on that port (e.g., one participant for each VLAN on that port in GMRP, and one participant for each port in GVRP). Each GARP participant may have both application-specific behavior and the GARP Information Declaration (GID) component, which may comprise, inter alia, one or more attribute values. An attribute is the application-specific information that is being propagated by GARP; e.g., a group MAC addresses and service requirements for GMRP, VIDs for GVRP, etc.

Notably, in addition to the GARP application protocols, IEEE 802.1p also explains how to utilize a tagging scheme to allow frames to be tagged with priority information and an optional VID. The prioritization operates at the MAC layer of the traffic, and classifies (groups) traffic into separate traffic classes. Eight classes are defined by IEEE 802.1p, which are to be configured manually by network administrators (the IEEE has made broad recommendations), and registered throughout the network. Illustratively, the highest priority is seven, which, for example, may be assigned to network-critical traffic, such as Routing Information Protocol (RIP) and Open Shortest Path First (OSPF) updates. Values five and six may be used for delay-sensitive applications such as interactive video and voice, while data classes four through one range from controlled-load applications such as streaming multimedia and business-critical traffic down to "loss eligible" traffic. The zero value is used as a best-effort default, which may be invoked automatically when no other value has been set.

A new IEEE project, P802.1ak (Draft 5.1), identifies the Multiple Registration Protocol (MRP) standard for use with registrations (officially entitled the "Standard for Local and Metropolitan Area Networks Virtual Bridged Local Area Networks—Amendment 07: Multiple Registration Protocol"). MRP, an update (or replacement) to GARP, allows participants in an MRP Application to register attributes with other participants in a bridged LAN. A Multiple VLAN Registration Protocol (MVRP) is defined within IEEE P802.1ak to communicate topology changes for each VLAN independently of the spanning tree supporting the VLAN (e.g., an update to GVRP). This allows multiple VLANs to use a single spanning tree without requiring a bridge to relearn addresses for a given VLAN when a topology change does not change the bridge ports used to reach end is stations receiving frames for that VLAN, as will also be understood by those skilled in the art. A Multiple Multicast Registration Protocol (MMRP) is also defined that updates GMRP in a similar manner. Those skilled in the art will understand that the MRP update allows for reduced fault recovery time (convergence time) and reduced disruption of traffic in a very large network due to a topology change in a small portion of that network.

Multipoint-to-Multipoint Service Bandwidth Considerations

Customers (users) often desire to send traffic across a provider network (e.g., a bridged network) to other customers. These traffic or data "flows" enter the provider network from a source customer, e.g., at a User-Customer Interface (UNI), and traverse nodes (e.g., bridges) of the provider network to reach the destination customer of the flow, e.g., at a remote UNI. Notably, if one provider network is attached to another provider network, the networks may be attached by Network Node Interfaces (NNIs). These customer-to-customer or "point-to-point" (P2P) transmissions (services) may require the use of a certain amount of bandwidth (BW) to transmit the data. In some instances, it is desirable to guarantee or reserve the BW required for the transmission along the path of the data flow between points (a "conversation"), e.g., according to a particular spanning tree, to ensure that the traffic flowing between the points has enough BW. Otherwise, traffic may be dropped or suspended due to excess traffic along the path, e.g., due to other flows or conversations. The BW required for P2P services is relatively straightforward to define. For instance, committed BW and burst error rates (as will be understood by those skilled in the art) may be defined at each end point of the P2P service, such as by a service level agreement (SLA) between the customer(s) and the provider network(s). Once these BW values are defined, the load at each port within the provider network along the single path (spanning tree) between points will have a maximum value corresponding to the BW values defined for each end point.

"Multipoint-to-Multipoint" (MP2MP) services, on the other hand, are services in which any number of multiple points (e.g., customers) can transmit and receive data flows across the network to/from any number of other multiple points (i.e., more than two UNIs). The difficulty associated with creating and enforcing an MP2MP SLA is that the flow of data on an MP2MP service depends on a mixture of source and destination customers (i.e., MAC addresses) at any given moment in time. Currently, MP2MP SLAs for BW are difficult to define, for example, resulting in SLAs such as a "10 Mb/s 20 UNI service." Enforcing such an SLA is even more difficult. For instance, the ambiguity of where the 10 Mb/s limits should be applied/enforced may create a number of problems within the network. For example, limiting the total amount of BW for the entire MP2MP service to 10 Mb/s is difficult to enforce without knowing what traffic is being transmitted at all times. Alternatively, each UNI (e.g., of the 20 UNIs) may be limited to transmit 10 Mb/s each. However, this may result in 19 of the 20 UNIs sending a 10 Mb/s data flow to a single UNI, which would then limit the 190 Mb/s of flows to the maximum 10 Mb/s restriction. This may be particularly wasteful of BW on the provider network, for example, where the 19 UNIs are located in a localized location (e.g., New York City), while the single receiving UNI is located in a remote location far across the network (e.g., Los Angeles). The 190 Mb/s of data flows would traverse the entire United States only to have 180 Mb/s removed at the end point.

In addition to surpassing end point limits, nodes (e.g., bridges) within the provider network may not be able to support all of the MP2MP service data flows (conversations) if each data flow is utilizing the maximum amount of BW allowed, e.g., depending upon connectivity internal to the provider network and BW allocation. In order to prevent this situation, the network may police (e.g., mark frames as "red," "yellow," and "green") and enforce (e.g., dropping red frames immediately, and dropping yellow frames before green frames) traffic at certain points (e.g., ports) within the provider network. Those skilled in the art will understand that policing/enforcing of frames may be specific to a certain service, a certain priority level within the service, a certain color (e.g., red/yellow/green), and in a particular direction (e.g., input to the port or output from the port). As used herein, these parameters are signified by a "{service, priority, color, direction}" tuple, as will also be understood by those skilled in the art.

Generally, it is very difficult to determine which ports to police within the network for MP2MP services, and to determine what the BW limits on each port should be. There remains a need, therefore, for a technique that efficiently defines an MP2MP SLA, and efficiently enforces that MP2MP SLA within the network. In particular, there remains a need to "push back" the input and/or output BW limits imposed at the ports implementing an SLA in order to prevent wasting excess BW throughout the interior of the network, i.e., to prevent transmission of BW that will eventually be discarded.

SUMMARY OF THE INVENTION

The present invention is directed to a technique for efficiently managing bandwidth (BW) for multipoint-to-multipoint (MP2MP) services in a provider network of a computer network. According to the novel technique, each intermediate network device, e.g., a bridge, having a user-network interface (UNI) port of an MP2MP service generates a registration for the service, e.g., using the Generic Attribute Registration Protocol (GARP), the Multiple Registration Protocol (MRP), etc. The registration carries maximum BW values for each port direction, e.g., as defined by a Service Level Agreement (SLA). For instance, each registration may correspond to one value for each direction (input or output) and for each color (e.g., yellow and green) of each priority level of each MP2MP service, i.e., a maximum BW for each {service, priority, color, direction} tuple.

The registrations are advertised (distributed) among neighboring bridges throughout the network toward other UNI ports of the MP2MP service. Specifically, as each bridge receives registrations from each neighboring bridge (or from the UNI port), the bridge advertises registered BW values pertaining to a particular direction on a particular one of its ports that correspond to the sum of the BW values for that direction (e.g., per {service, priority, color} triple) received on all of the other ports of the bridge, up to a maximum BW value (e.g., configured or physical) for the particular port. In other words, the total output BW registrations provided by all of the other ports define the output BW registration advertised by the particular port (max BW output due to "fan in"), while the total input BW registrations received on all of the other ports define the input BW registrations advertised by the particular port (max BW input allowed by "fan out").

Any bridge ports receiving registrations from both directions (i.e., ports on a utilized spanning tree) are "active ports" and, thus, allocate (reserve) BW for the MP2MP service. Illustratively, the actual BW required for allocation on an active port for each direction (e.g., for each {service, priority, color} triple) is the lower of either the registered value advertised from the port in a particular direction or the registered value received at the port in the opposite direction. Put another way, an active port does not deliver (output) more BW than the neighbor can receive (input), nor does it input more BW than the neighbor can output. Notably, if the advertised output BW on a port of a bridge is greater than the actual output BW for the port, the bridge may police/enforce a rate limiter on the port to match the actual output BW. Policing/enforcing of the input BW of the port may also be employed where a source is not trusted, e.g., at a UNI port.

Moreover, a novel "connectivity priority" may be assigned to each MP2MP service, i.e., for each {service, priority, color} triple, to enable determination of which service to police/enforce (e.g., drop, suspend, block, etc.) in the event a port is oversubscribed. The connectivity priority is a property of the service that may be invoked when the BW capacity of the port is exceeded despite the BW registration and allocation aspects of the inventive technique described herein. In that event, the port may block transmission and reception of the service(s) having the lowest connectivity priority, so that those services not blocked can meet their levels of service guaranteed by their SLAs.

Advantageously, the novel technique efficiently manages BW for MP2MP services in a provider network of a computer network. By calculating the maximum actual BW to be used at each port of the network, the novel technique allows for configured BW maximums to be "pushed back" into the network, thus alleviating excess wasted BW. In particular, the present invention allows for intermediate network devices, such as bridges and/or switches, of the network to effectively manage the BW for MP2MP services at each port, rather than sending excess BW to ports that are unable to handle such BW. Also, the novel technique provides the ability to effectively create and manage MP2MP SLAs, which may also account for the service provider network's topology. Further, the dynamic nature of the novel technique alleviates the need for cumbersome manual configuration.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF AN
ILLUSTRATIVE EMBODIMENT

Figure 1:
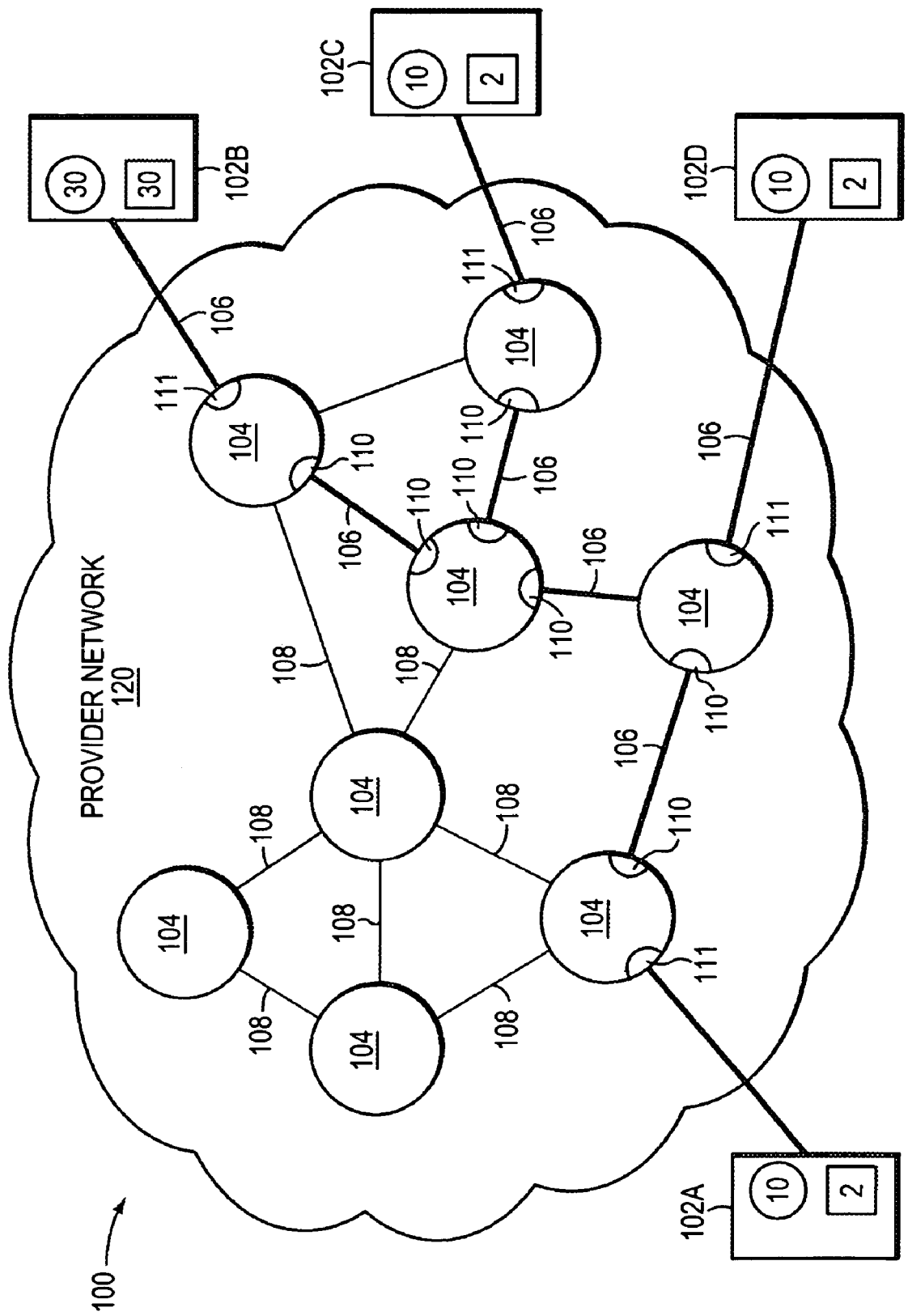
FIG. 1 is a highly schematic illustration of a computer network in accordance with the present invention.

FIG. 1 is a highly schematic illustration of a computer network 100 in accordance with the present invention. Network 100 includes a provider network 120 having a plurality of interconnected intermediate network devices 104 which, illustratively, are bridges. The bridges are attached to each other and to end stations 102 (e.g., 102A-D) by a plurality of local area networks (LANs) 106/108. The bridges 104 are interconnected by a plurality of LANs 106/108, which may comprise shared media or point-to-point links/segments.

Each bridge 104 has a plurality of ports 110 (and 111) for receiving and forwarding messages across the network 100. The ports of each bridge 104, moreover, may be identified, e.g., by port numbers, such a Port 0 (P0), Port 1 (P1), Port 2 (P2), etc., so that the entities that can be reached by a respective bridge can be associated with the particular port used to reach them. Bridge ports 111 that are coupled to LANs connected only to end stations, and not to other bridges, are referred to as "access ports" or User-Network Interface (UNI) ports. Bridge ports 110 that connect via a LAN 106/108 to another intermediate network device, e.g., to a neighboring bridge, are referred to as "trunk ports."

It should be understood that the network 100 of FIG. 1 is meant for illustrative purposes only, and that the present invention will operate with other networks having simpler or possibly far more complex topologies.

As shown, network 100 includes a plurality of loops. Execution of a spanning tree protocol, such as the Spanning Tree Protocol (STP) defined in IEEE Std. 802.1D-2004, prevents loops by defining a loop-free topology (i.e., an active topology) in the bridged network 100. In particular, the LANs identified as bold lines (106) are LANs (segments) of an illustrative spanning tree (the active topology), while the other lines (108) are LANs not of the illustrative spanning tree, as will be understood by those skilled in the art.

Figure 2:
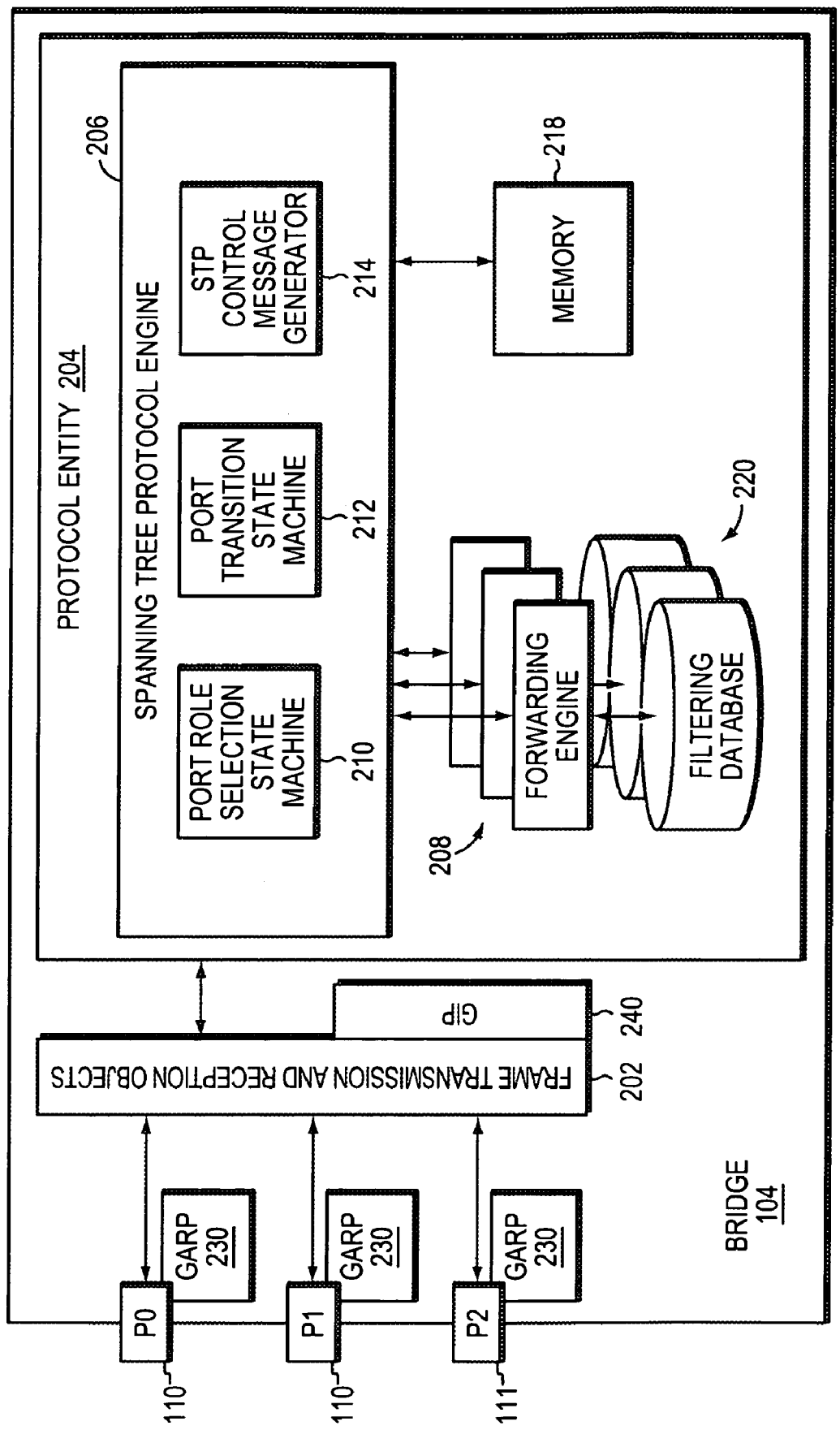
FIG. 2 is a partial block diagram of an exemplary bridge that may be used in accordance with the present invention.

FIG. 2 is a partial block diagram of an exemplary bridge 104. As indicated above, the bridge has a plurality of ports 110/111, each of which is preferably identified by a number (e.g., P0-P2). One or more frame transmission and reception objects, designated generally 202, are associated with the ports 110/111 such that network messages, including data frames, received at a given port, e.g., P1, may be captured, and frames to be transmitted by bridge 104 may be delivered to a given port, e.g., P2. Frame reception and transmission objects 202 are preferably message storage structures, such as priority queues.

Bridge 104 further includes at least one protocol entity 204 that is in communicating relationship with the frame transmission and reception objects 202, and that comprises a plurality of components. In particular, the protocol entity 204 includes at least one spanning tree protocol (STP) engine 206 and one or more forwarding engines 208. The STP engine 206 preferably comprises a plurality of subcomponents, such as, inter alia, a port role selection state machine 210, a port transition state machine 212, and a STP control message generator 214. The STP engine 206 constructs a set of spanning tree instances, one for each bridge in the network. These spanning tree instances are created in a manner similar to that in IEEE Std. 802.1Q-2005, which is hereby incorporated by reference in its entirety. The STP engine 206 includes or is in communicating relationship with a memory 218, which may be a volatile and/or non-volatile random access memory (RAM) or some other memory device. Memory 218 is preferably organized to include a plurality of records or cells (not shown) for storing spanning tree related information or parameters, such as the bridge's numeric bridge identifier (ID), the registered values for each port P0-P2, etc.

The one or more forwarding engines 208 are preferably coupled to one or more filtering databases 220 that stores address information corresponding to the entities of network 100 (FIG. 1). Each filtering database preferably has a plurality of records (not shown) each containing a plurality of cells, including a destination address cell, a destination port cell and a corresponding timer cell. Each record in the filtering databases 220 preferably corresponds to a particular network entity.

The forwarding engines 208 are configured to switch or bridge messages, such as packets and/or frames, from a source port 110 to one or more destinations ports 110 depending on information contained in the appropriate filtering database 220, and also depending on the spanning tree port states of the respective ports 110, as managed by STP engine 206. The forwarding engines 208 are also in communicating relationship with the STP engine 206, and may relay STP control messages, such as registration (e.g., GARP) protocol data unit (PDU) messages, received at ports 110 thereto.

Figure 3:
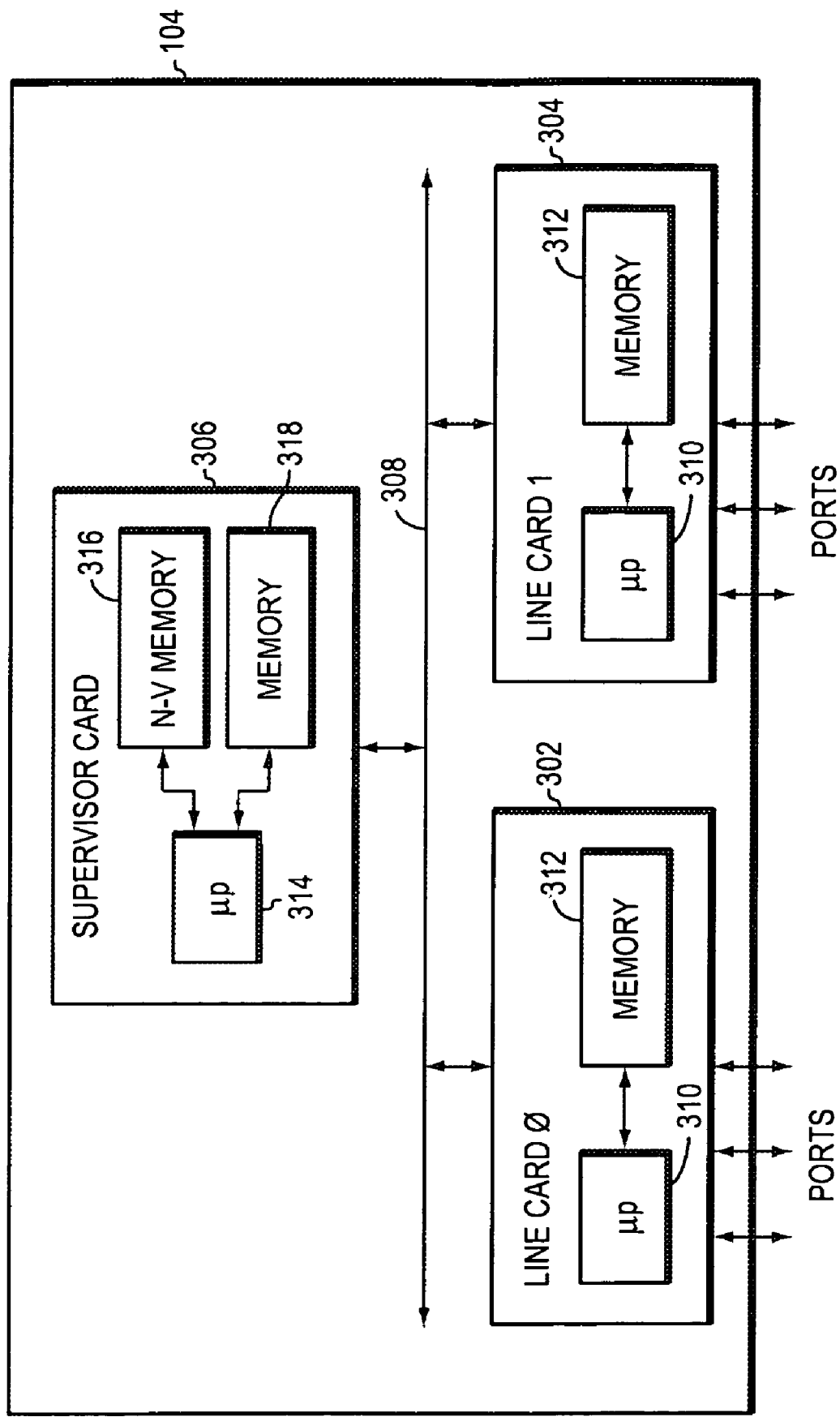
FIG. 3 is another highly schematic, partial block diagram of a bridge that may be used in accordance with the present invention.

In the illustrated embodiment, bridge 104 includes transmitting and receiving circuitry, including one or more line cards and/or network interface cards (NICs) establishing ports for the exchange of network messages, one or more supervisor cards having central processing units (CPUs) and/or microprocessors and associated memory devices for performing computations and storing the results therefrom and one or more bus structures. FIG. 3 is another highly schematic, partial block diagram of bridge 104 illustrating such components. As shown in FIG. 3, bridge 104 includes a plurality of line cards 302 and 304, and a supervisor card 306. Cards 302, 304 and 306 are in communicating relationship with each other through a communication bus 308. Each of the line cards 302 and 304 includes a microprocessor (μP) 310 and at least one memory 312. The supervisor card 306 also includes a μP 314, as well as both a non-volatile (N-V) memory 316 and a volatile memory 318, e.g., RAM.

Referring again to FIG. 2, it will be understood by those skilled in the art that STP engine 206 and forwarding engines 208 may each comprise registers and combinational logic configured and arranged to produce sequential logic circuits. In the illustrated embodiment, engines 206 and 208 are preferably software modules or libraries containing program instructions pertaining to the methods described herein and executable by one or more processing elements, such as the microprocessors 310 and/or 314 (FIG. 3), of bridge 104. Other computer readable media may also be used to store and execute these program instructions. Nonetheless, those skilled in the art will recognize that various combinations of software and hardware, including firmware, may be utilized to implement the present invention.

Suitable intermediate network device platforms for use with the present invention include, but are not limited to, the commercially available series of switches from Cisco Systems, Inc. of San Jose, Calif., such as the Catalyst 6500, 7600, 3500, and GRS.

As mentioned above, the IEEE developed the Generic Attribute Registration Protocol (GARP) in IEEE Std. 802.1D, 1998 edition. As its name implies, GARP provides a framework that allows participants to make and withdraw declarations for generic attributes. In response to a GARP declaration, other network participants register the parameter value(s) of the specified attribute at the port on which the declaration was received. GARP participants also propagate declarations so that other participants in the network can make appropriate registrations. Participants can also withdraw their previous declarations. In response to a withdrawal, the other participants de-register the particular parameter value(s).

Figure 4:
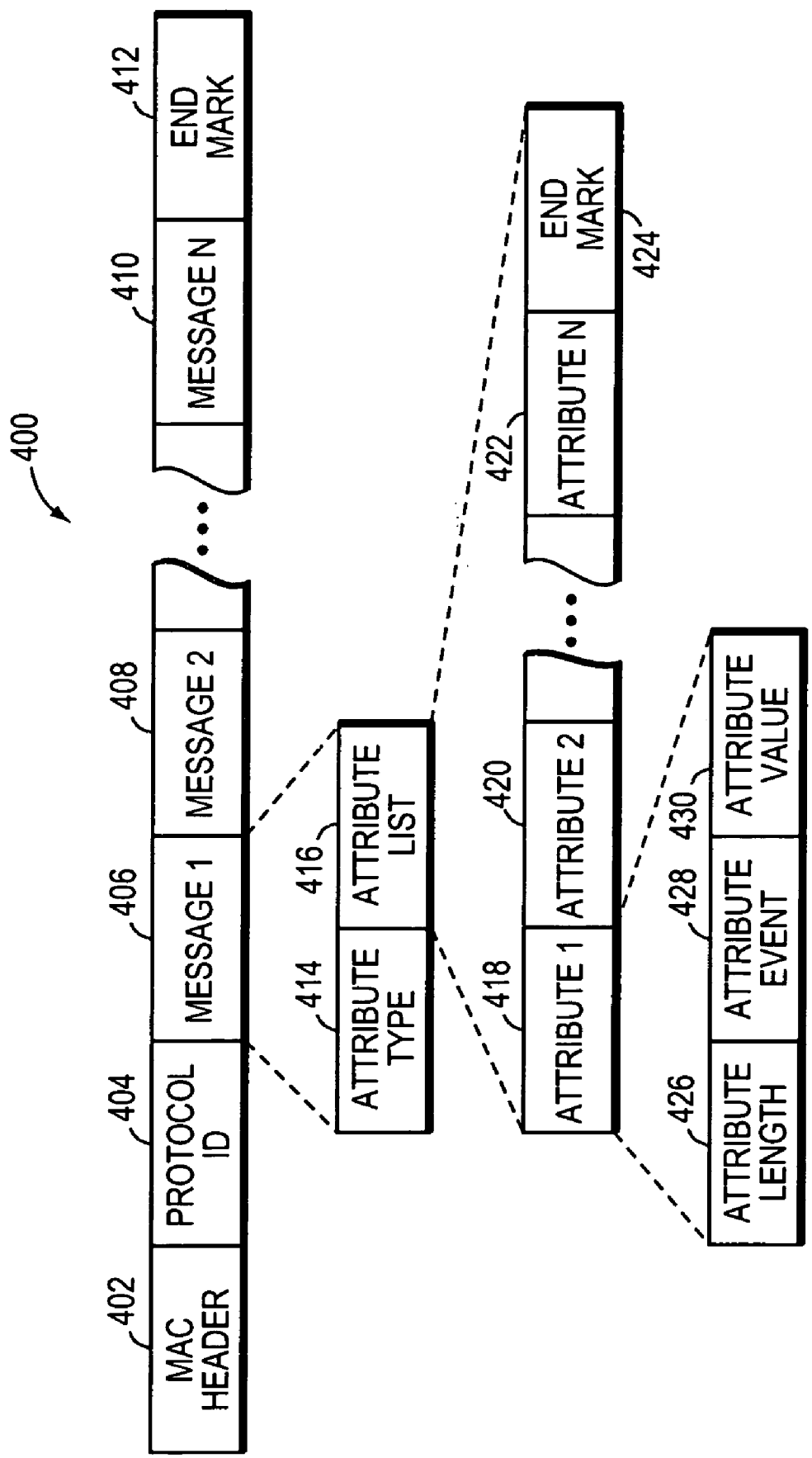
FIG. 4 is a block diagram of a conventional registration PDU message that may be used in accordance with the present invention.

A GARP participant consists of a GARP application component and a GARP Information Declaration (GID) component. The GID component comprises a set of state machines that define the current registration and declaration state for all attribute values. A GARP participant is typically established for each port per GARP application. Thus, for intermediate devices, which often have multiple ports, multiple GARP participants are established (230, FIG. 2). To make or withdraw declarations, GARP participants generate and send special messages called GARP Protocol Data Unit (GARP PDU) messages. FIG. 4 is a block diagram of a conventional GARP PDU message 400. Those skilled in the art will understand that while a GARP PDU message 400 is shown, that other registration messages (e.g., Multiple Registration Protocol, MRP PDU messages) may also be utilized with the present invention. The illustrative registration message 400 typically includes a Media Access Control (MAC) header 402 that includes destination and source address fields, among other information, a protocol identifier (ID) field 404, a plurality of message fields, such as message fields 406, 408 and 410, and an end mark field 412. Each message field, moreover, includes an attribute type field 414 and an attribute list field 416. The attribute list field 416, in turn, includes one or more attribute fields, such as attribute fields 418, 420 and 422, and an end mark field 424. Each attribute field, such as field 418, includes a 1-byte attribute length field 426, a 1-byte attribute event field 428 and a variable length attribute value field 430.

In order to exchange information among the GARP participants disposed within a given intermediate device, a separate component, called the GARP Information Propagation (GIP) component (240, FIG. 2), is used. The GIP component operates over a GIP context that is established at the intermediate device and defines the ports that are to be included in the given context. That is, although registration can occur at any port, the propagation of that registration only follows the associated GIP context. For example, a GIP context may comprise the ports that belong to the active topology (i.e., all ports in the forwarding spanning tree state). Because blocked ports are not part of the GIP context, a declaration received on a blocked port is not propagated to any other ports, although it is still registered at the blocked port. In contrast, a declaration received at a port that is in the forwarding spanning tree state is both registered at that port and propagated throughout the GIP context (i.e., to all of the other ports that are in the forwarding state).

As an example of registration attribute propagation, in order to limit the transmission of broadcasts, multicasts and unicast floods associated with a given VID, the IEEE specified an application based on GARP to disseminate VLAN membership information across computer networks. This application, which has been standardized by the IEEE, is known as the GARP VLAN Registration Protocol (GVRP). See IEEE Std. 802.1Q-2005 specification standard. According to GVRP, a bridge starts with the list of VLANs assigned to its access ports. All broadcasts, multicasts and flooded unicasts associated with these listed VLANs need to be received at the bridge. GVRP provides a mechanism for bridges to transmit their lists to the other bridges in order to register these VLANs at the other bridges' trunk ports. Specifically, the bridge generates a GARP PDU message 400 that has an attribute structure, i.e., fields 426, 428 and 430 for each VLAN in the bridge's list of VLANs. The bridge transmits the GARP PDU message 400 from each of its trunk ports. The GARP PDU messages 400 are received on the trunk ports of neighboring bridges. Assuming the GARP PDU message 400 is received on a port in the forwarding spanning tree port state, the receiving bridge registers the list of the VLANs contained in the GARP PDU at all of its other ports that are also in the forwarding state, and not just is on the port at which the GARP PDU message 400 was received. The neighboring bridge then generates and transmits GARP PDU messages 400 of its own that list both the VLANs associated with the neighboring bridge's access ports, and the VLANs that were registered as a result of having received a GARP PDU message from the original bridge. If a GARP PDU message is received at a port that is in the blocking spanning tree port state, the VLANs contained in the GARP PDU message are registered at that blocked port, but they are not registered at any other bridge port nor are they used in GARP PDU messages sent by the bridge. Notably, other registered attributes may be distributed throughout the network in a similar manner to VLAN registrations, as will be understood by those skilled in the art and illustratively applied to the present invention described herein.

The present invention is directed to a technique for efficiently managing bandwidth (BW) for multipoint-to-multipoint (MP2MP) services in a provider network of a computer network. In accordance with one aspect of the present invention, a Service Level Agreement (SLA) may be defined for a particular MP2MP service to establish certain properties of the service, such as, illustratively, maximum BW values. In particular, the SLA may define BW requirements in each direction (input and output) at each UNI port (111) to the multiple customer devices (102), and also the BW requirements in each direction at certain points within the provider network (120). The SLA, therefore, can depend on the provider's topology as well as the UNI port topology. Illustratively, the MP2MP SLA may define, among other things, BW requirements of UNI ports, intra-cloud trunks, NNI ports, all ports generally, and the service generally. Specifically, UNI port requirements (limitations) may be defined for each customer (102A-D) that correspond to at least one of a particular direction, a particular color, and a particular priority for the particular service, i.e., a "{service, priority, color, direction}" tuple. For instance, a BW requirement may be defined for one priority yellow input traffic, yellow output traffic, green input traffic, green output traffic, and for another priority, etc. Referring again to FIG. 1, customer 102B (e.g., a corporate headquarters) may have an input BW vakye if 30 MB/s ("30

(i)" herein, 30 in a circle in Figures). and an output BW value of 30 Mb/s ("30(o)" herein, 30 in a box in Figures). (Those skilled in is the art will understand that while only one BW value for each of an input and output of a service is shown and used herein for simplicity, each {service, priority, color} triple may have its own defined BW values.) Customers 102A, C, and D (e.g., remote offices), on the other hand, may have required BW values of 10(i) and 2(o). Notably, the BW values for the UNI ports/links may be configured values, or physical limits (e.g., line rates) of the ports/links of the customer and/or UNI.

The MP2MP SLA may also define intra-cloud trunk BW requirements/limitations that are manually configured or determined dynamically, as described below. NNI ports may also have BW requirements/limitations based on the SLA (configured or dynamic) as well as through inter-provider agreements (redundant NNIs have the same parameters). Also, each port of the provider network may have an "over-subscription ratio/multiplier" (described below), as will be understood by those skilled in the art, for example, configured per port individually, by class (UNI, NNI, trunks, etc.), or a constant value for all ports of the service. Further, the service itself may have an assigned "connectivity priority," as described in further detail below.

In accordance with another aspect of the present invention, the amount of BW required for a given MP2MP service is determined for each port of the provider network in a dynamic manner, e.g., a "dynamic bandwidth control" technique. Each bridge 104 having a UNI port 111 of an MP2MP service generates (e.g., according to the SLA) or receives (e.g., from a customer 102) a registration that carries maximum BW values for the service using registration messages 400 (e.g., GARP, MRP, etc.). The registration may also be generated by the UNI port 111 in response to a received reservation request from a customer (e.g., using the Resource ReServation Protocol, RSVP, as will be understood by those skilled in the art). The registration carries maximum BW values for each port direction in the corresponding attribute fields of FIG. 4 above, e.g., according to the SLA defined above. For instance, each registration 400 may correspond to one value for each direction (input or output), for each color (e.g., yellow and green) of each priority level of each MP2MP service, i.e., a maximum BW for each {service, priority, color, direction} tuple. Notably, the registration may carry other attributes, as will be understood by those skilled in the art.

The registrations 400 are advertised (distributed) among neighboring bridges throughout the network toward other UNI ports 111 of the MP2MP service (and, notably, no further). In particular, the registrations are rooted at ports that are limited only by configuration or line rate, typically the UNI ports. For example, in FIG. 1, assume that the UNI port connected to customer 102A generates a registration 400 for the input and output BW values of 10(i) and 2(o), respectively. The registration 400 may traverse other bridges 104, merge at bridges with other registrations 400 from other end points ("fan in"), split at bridges to be advertised out multiple ports ("fan out"), and otherwise cross paths on the way to other UNI ports along a selected spanning tree (e.g., LANs 106). Illustratively, the spanning tree is selected by the UNI port bridge 104 as the best tree to reach the destination end points, which, notably, should be the same spanning tree selected by each other UNI port bridge 104 of other customers (102 B-D). The UNI port 111 may inform the customer 102 of which VLAN ID (VID) to use for the particular panning tree, as will be understood by those skilled in the art.

Specifically, in accordance with the present invention, as each bridge 104 receives registrations 400 from each neighboring bridge 104 (or from the UNI port 111), the bridge advertises registered BW values pertaining to a particular direction on a particular one of its ports 110 that correspond to the sum of the BW values for that direction (e.g., per {service, priority, color} triple) received on all of the other ports 110 of the bridge, up to a maximum BW value (e.g., configured or physical) for the particular port. In other words, the total output BW registrations provided by all of the other ports (e.g., P0 and P1) define the output BW registration advertised by the particular port (e.g., P2), i.e., the maximum output BW of a port due to "fan in". Also, the total input BW registrations received on all of the other ports (e.g., P0 and P2) define the input BW registrations advertised by the particular port (e.g., P1), i.e., the maximum input BW allowed by "fan out".

Figure 5A:
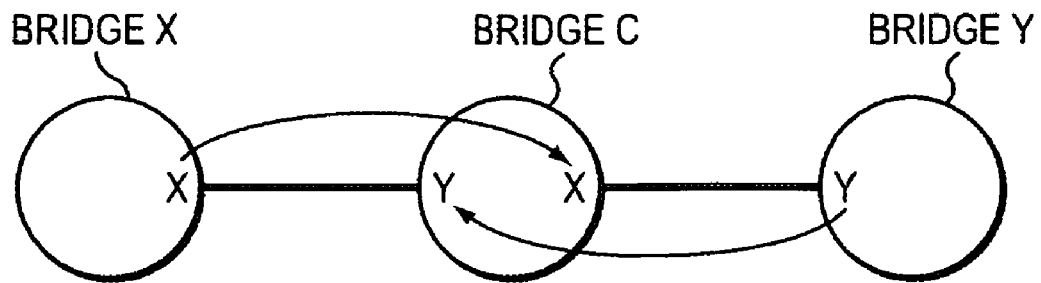
FIGS. 5A and 5B are schematic block diagrams of representative configurations for multiple bridges distributing registered BW values in accordance with the present invention.
Figure 5B:
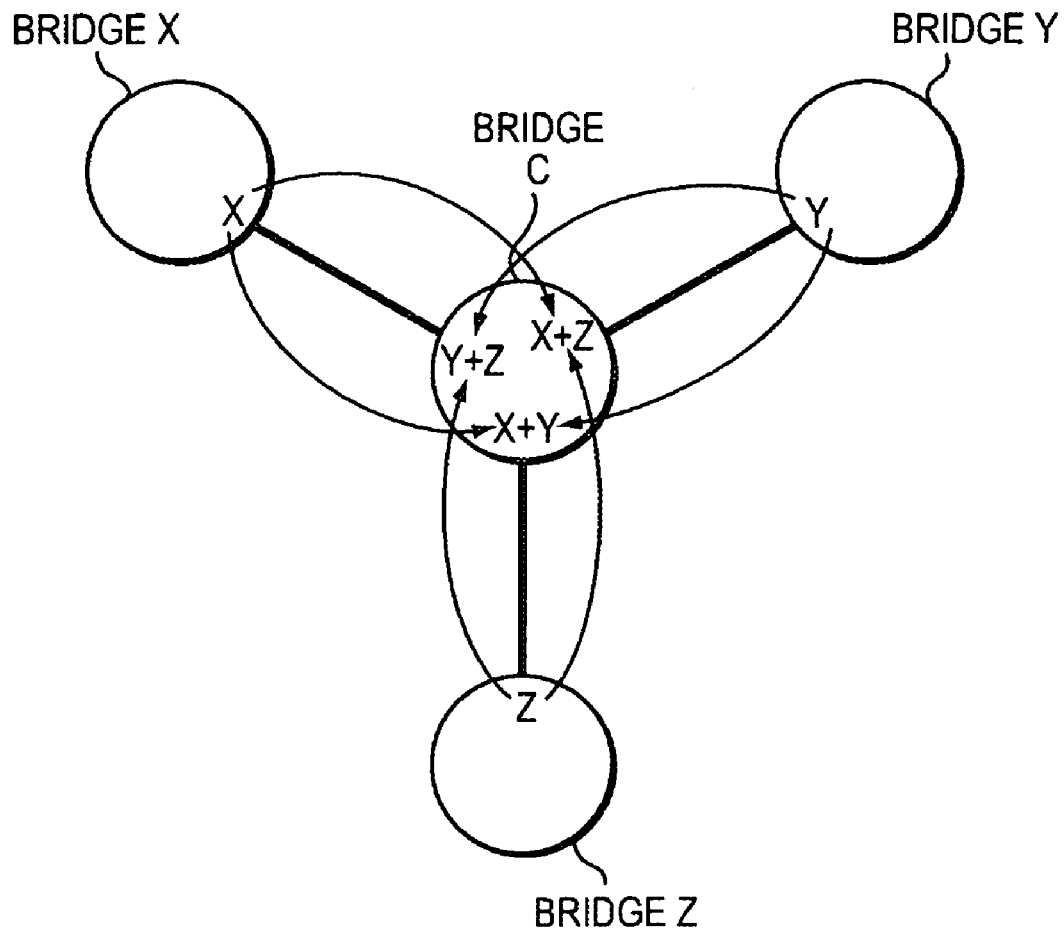

Any bridge ports 110 receiving registrations from both directions (i.e., ports on a utilized spanning tree) are "active ports" and, thus, allocate (reserve) BW for the MP2MP is service accordingly (i.e., based on other active ports of the bridge). Otherwise, the port merely receives or advertises registrations in one direction, but not on the direct path (active spanning tree LANs 106) between any of the end points (102A-D), as will be understood by those skilled in the art. FIGS. 5A and 5B are illustrative schematic block diagrams of representative configurations for multiple bridges distributing registered BW values in accordance with the present invention.

FIG. 5A shows a simple configuration of three bridges, such as bridges 104, arranged in a series. Assume that a left bridge (bridge X) advertises a registered output BW value of "X" to the center bridge (bridge C), and the right bridge (bridge Y) advertises a registered output BW value of "Y" to the center bridge. Upon receiving the registered output BW values from its neighboring bridges (i.e., the left and right bridges), the center bridge generates registrations 400 for each port that are equal to the received values on the opposing port for the same direction, e.g., output (i.e., signified by the arrows). In other words, what comes in on one port of the center bridge (e.g., a BW of X from the left bridge), goes out the other port of the center bridge (e.g., the BW of X to the right bridge). The advertised registered output BW values, then, indicate to neighbor bridge ports that the bridge is unable to generate and output more than "X" bandwidth from the port. Conversely, if the values X and Y of FIG. 5A are input BW values, the corresponding advertised registered input BW values, then, indicate to the neighbor bridge ports that the bridge is unable to sink more than "X" bandwidth on the input to this port.

FIG. 5B shows a slightly more complex configuration of four bridges, such as bridges 104, arranged in a "hub and spoke" arrangement as shown. The center bridge (the hub, bridge C) may receive a registration 400 from each of the three other bridges (bridges X, Y, and Z). As noted above, the value advertised from one particular port is the sum of the values received on the other (active) ports for the same direction. Now, as can be seen by the arrows, each port of the center bridge advertises registered BW values corresponding to the sum of the registered BW values received on the opposing two ports. For instance, the center bridge registers a BW value of "X+Y" to bridge Z, "Y+Z" to bridge X, and "X+Z" to bridge Y. Again, the resultant advertised registered output BW values represent the maximum bandwidth that may be received at (input to) the bridge over all ports (e.g., output BW from bridges X and Y), and output on a particular port (e.g., to bridge Z). Also, the resultant advertised registered input BW values represent the maximum bandwidth that may be received at (input to) a particular port of the bridge (e.g., output BW from bridges Z), and output (fanned out) on the remaining ports (e.g., to bridges X and Y). Notably, on shared media, the effective received registration BW value for a particular direction is the sum of the received registrations for that direction over the other switches/bridges coupled to the shared medium.

Figure 6:
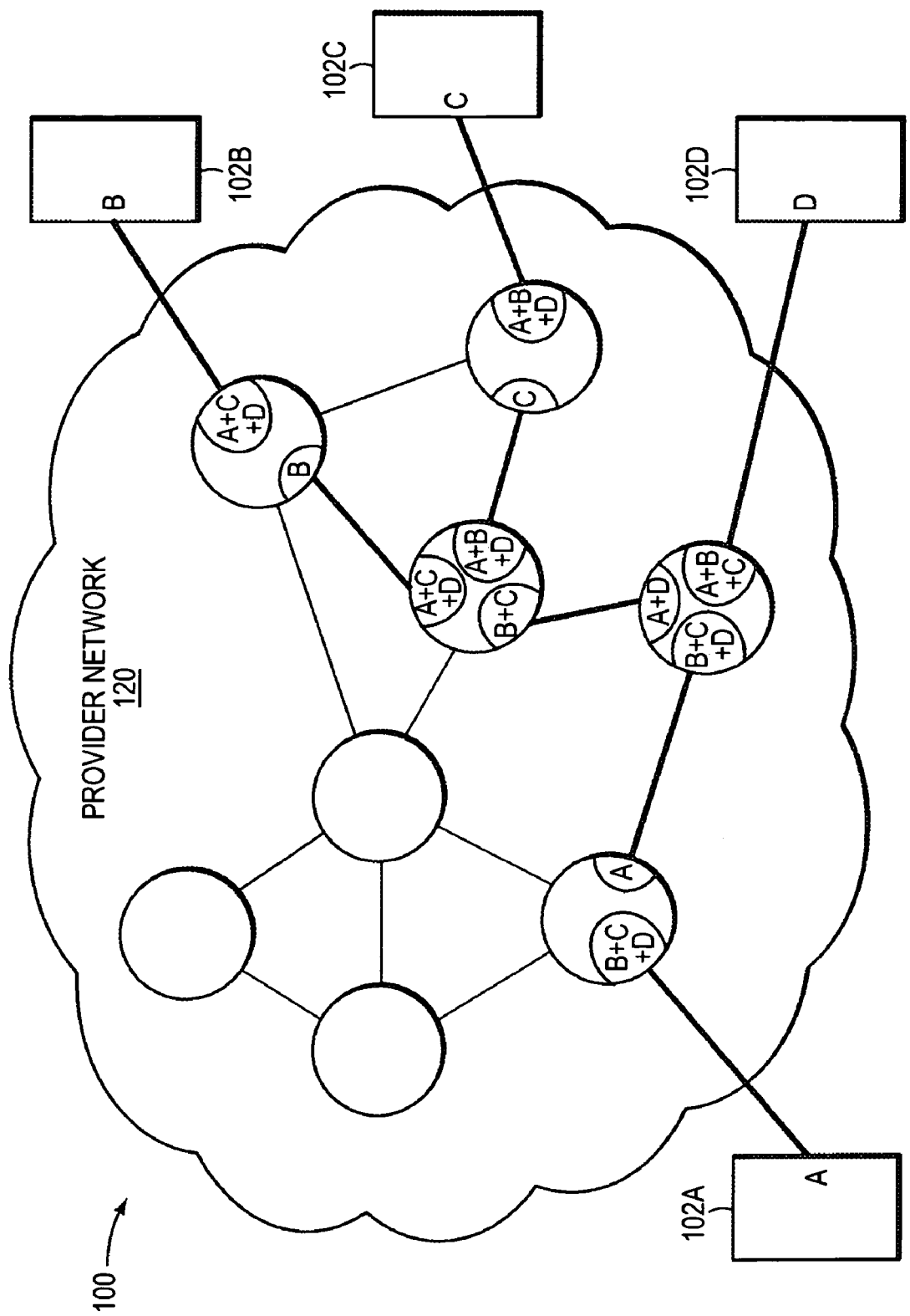
FIG. 6 is a highly schematic illustration of the computer network as in FIG. 1 showing representative registered BW value computational push backs in accordance with the present invention.

FIG. 6 is a highly schematic illustration of the computer network 100 as in FIG. 1 showing representative registered BW value computational "push backs" in accordance with the present invention. In particular, the technique as explained with representative FIGS. 5A and 5B is applied to the entire spanning tree network of FIG. 1. Representative registered BW values corresponding to customers 102A-D (e.g., values A-D) are shown. At each port, a computation is performed based on the techniques described above using the values A-D, and the results are carried over from one bridge to the next. Specifically, the computational "push back" can be seen at the UNI port input BW values (i.e., the sum of the possible destinations from a particular customer), as well as both input and output BW values within the network as appropriately aggregated in accordance with the present invention. In this manner, the BW requirements/limitations of each end point of the MP2MP service (conversation) is "pushed back" into all other ports of the network (i.e., affects each port's input and output BW values). For example, the UNI input port 111 connected to customer 102A can receive as much BW as it has the ability to sink (distribute) to each other destination customer end point (B+C+D).

Figure 7:
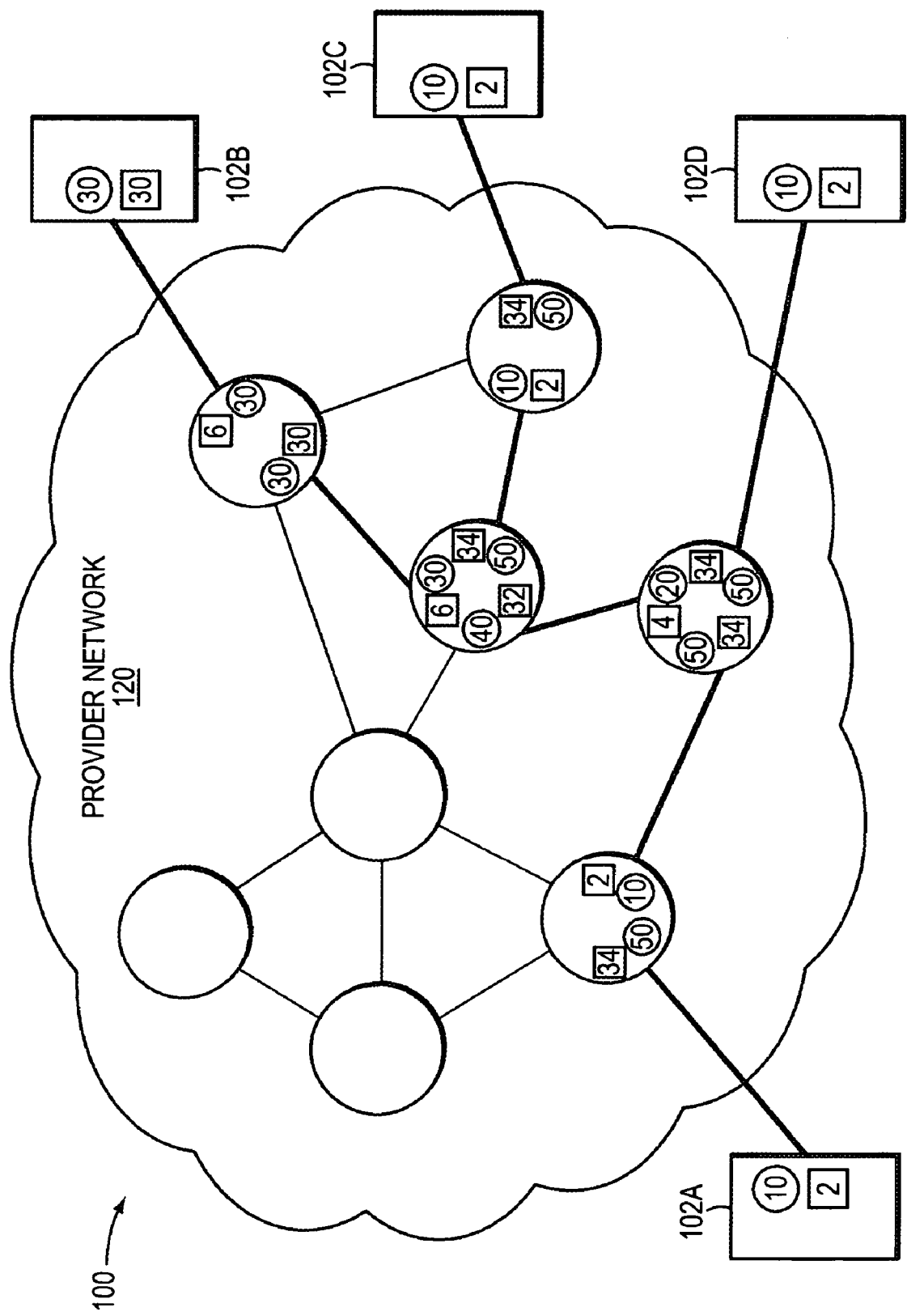
FIG. 7 is a highly schematic illustration of the computer network as in FIG. 6 showing registered BW values in accordance with the present invention.

FIG. 7 is a highly schematic illustration of the computer network 100 as in FIG. 6 showing registered BW values in accordance with the present invention. In particular, representations "A-D" have been replaced with the BW values (input "(i)" or circles and output "(o)" or boxes), and the resultant BW values have been computed. For example, the UNI input port 111 connected to customer 102A can receive up to 50 Mb/s, based on the ability to sink (distribute) the received data to each other destination customer end point (102B-D, 30+10+10).

Notably, if no BW registration 400 is received on a known active port (e.g., determined from other registration messages 400), the configured maximums for that port may be used in place of a received registered BW value. Also, those skilled in the art will appreciate that registering a BW value of "0" for all {service, priority, color, direction} fields effectively deregisters the VLAN on that port (e.g., as in MVRP/GVRP, etc.). Moreover, in the event of a topology change, new registrations may be advertised and received, and new values determined accordingly.

Illustratively, the actual BW required for allocation on an active port for each direction (e.g., for each {service, priority, color} triple) is the lower of either the registered value advertised from the port in a particular direction or the registered value received at the port in the opposite direction. Put another way, an active port does not deliver (output) more BW than the neighbor can receive (input), nor does it input more BW than the neighbor can output. That is, the use of a spanning tree (LANs 106) ensures that any port that is in a service carrying data is the only port that connects the two halves of the tree partitioned by that port. Therefore, the sum of all the input BWs on one side of port is maximum amount of BW that can be sent out that port, and the sum of all the output BWs on one side is the maximum amount of BW that could be carried away on that port. As such, the minimum of these two values (advertised registered value for one direction and received registered value for the opposite direction) is the maximum BW that can usefully be allocated for a given transmission direction (i.e., output from one port and input to another port). Any more BW traversing the ports is wasteful of the port's BW. In this manner, the present invention "pushes back" the requirements/limitations of the end points of the MP2MP service into the interior of the provider network, and to each other end point of the service.

Figure 8:
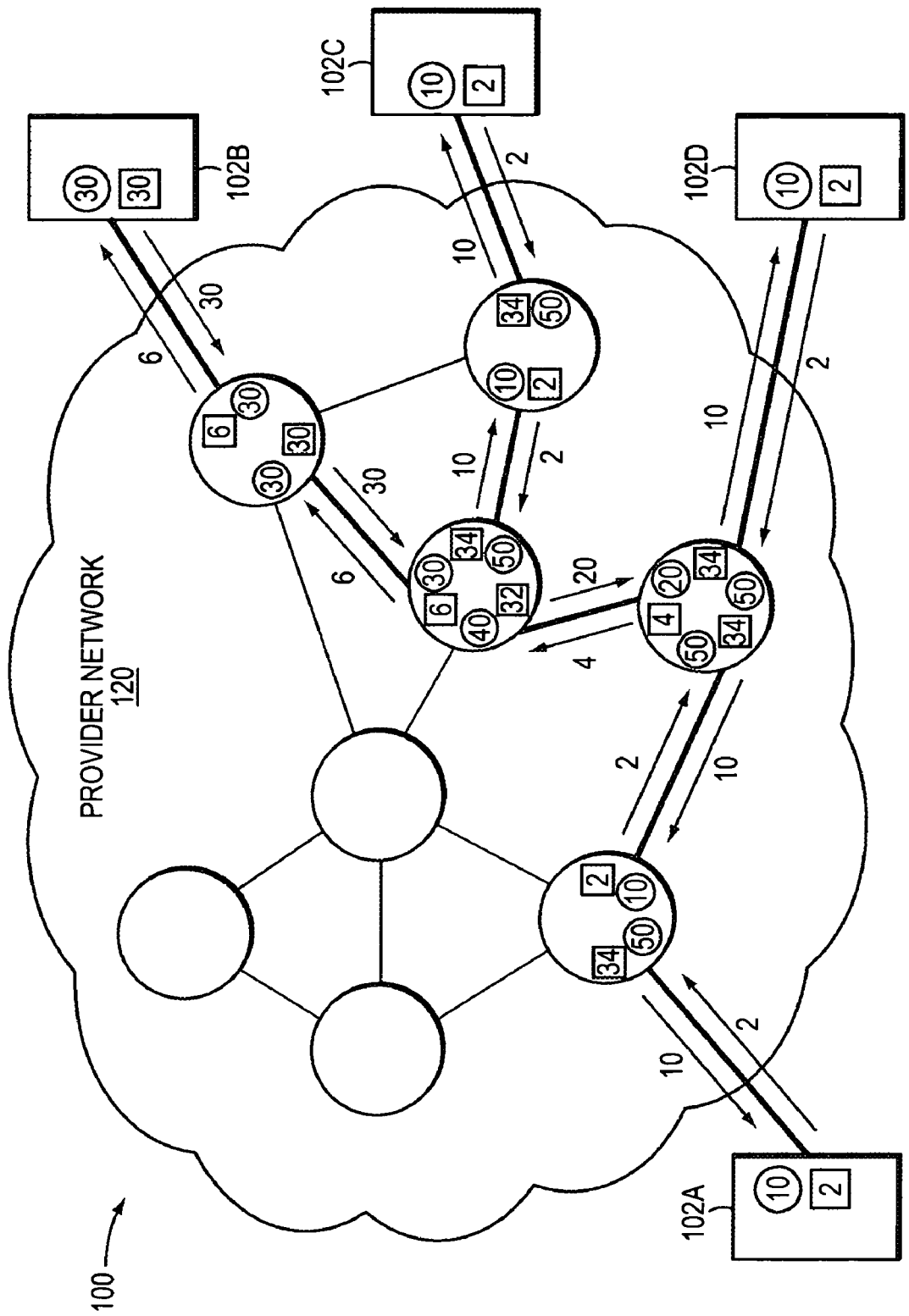
FIG. 8 is a highly schematic illustration of the computer network as in FIG. 7 showing actual BW values in accordance with the present invention.

FIG. 8 is a highly schematic illustration of the computer network 100 as in FIG. 7 showing actual BW values in accordance with the present invention. Illustratively, the arrows between ports represent the data flow direction between bridges (out from one, into another), and the value associated with each arrow represents the actual BW value, i.e., the lower value between the two corresponding (complimentary) ports. For example, the UNI port 111 input from customer 102A can receive up to 50 Mb/s. However, customer 102A can only send up to 2 Mb/s, so the actual BW allocated on the UNI input port 111 is 2 Mb/s, or "2."

Figure 9:
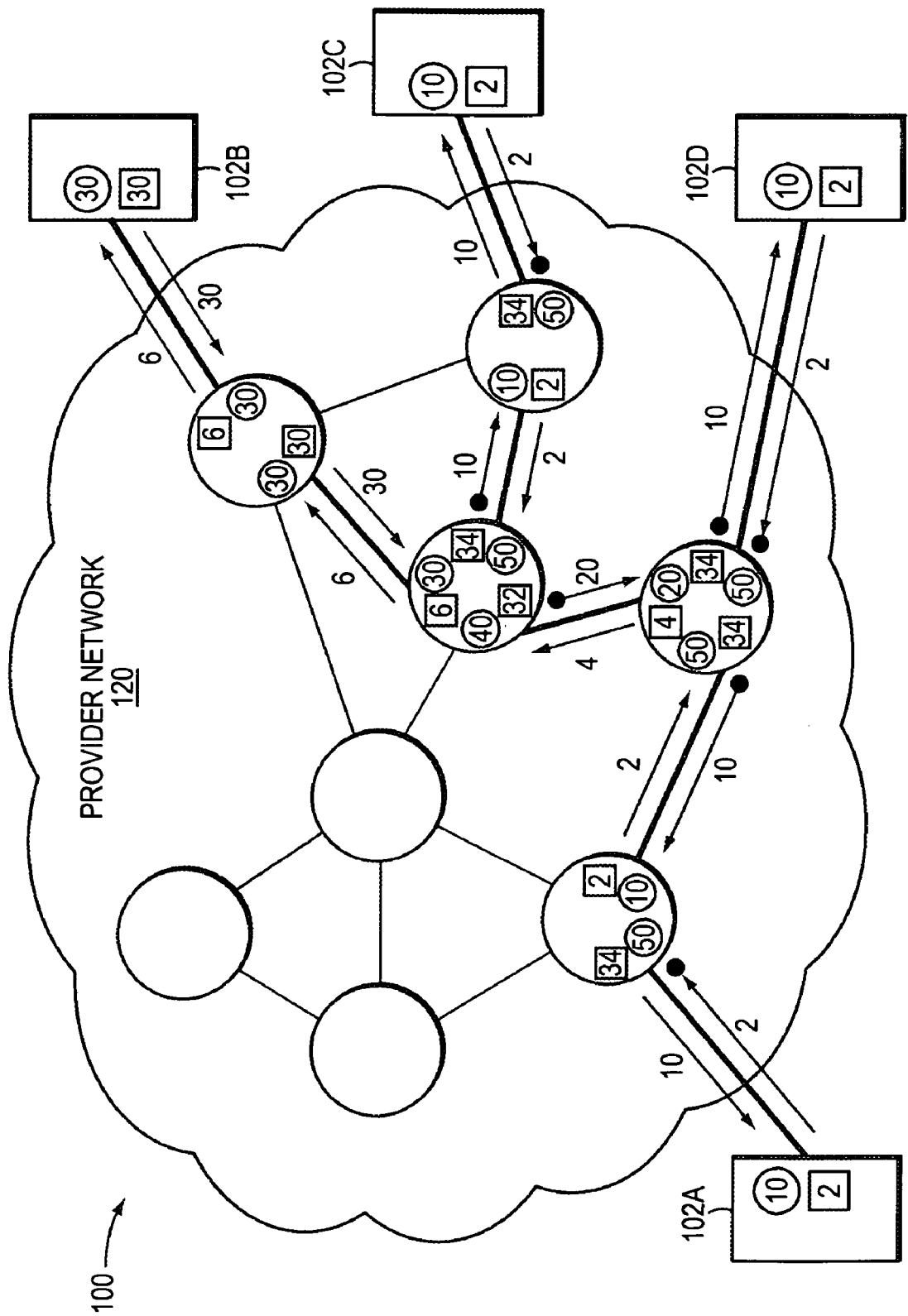
FIG. 9 is a highly schematic illustration of the computer network as in FIG. 8 with rate limiters in accordance with the present invention.

Notably, if the advertised output BW on a port of a bridge is greater than the actual output BW for the port, the bridge may police/enforce a rate limiter on the port to match the actual output BW. FIG. 9 is a highly schematic illustration of the computer network 100 as in FIG. 8 with rate limiters in accordance with the present invention. For instance, in order to protect individual LANs 106 of the network, the output BW is rate limited to match the actual output BW, otherwise BW is wasted on that LAN, i.e., it will be discarded somewhere further along the path. Illustratively, those output ports with a registered output BW greater than the actual output BW (e.g., 34>10, 32>20, 34>10, etc.) have filled circles (spots) indicating the rate limiting (policing/enforcing). If the advertised output BW is not greater than the actual output BW for the port, no action is required, since the port could not exceed the actual output BW. Also, it is important to note that in the event the actual BW exceeds the effective BW of a port (i.e., the actual BW times an oversubscription ratio/multiplier), load shedding may be required when the BW used (up to the actual BW) is greater than what the port physically will allow (the effective BW). Further, policing/enforcing the input BW may also be employed where a source is not trusted, e.g., at a UNI port 111, such as the spots on the input ports of UNI ports for customers 102A, C, and D in FIG. 9.

Moreover, a novel "connectivity priority" may be assigned to each MP2MP service, i.e., for each {service, priority, color} triple, to enable determination of which service to police/enforce (e.g., drop, suspend, block, etc.) in the event a port is oversubscribed. The connectivity priority is a property of the service that may be invoked when the BW capacity of the port is exceeded despite the BW registration and allocation aspects of the inventive technique described herein. In that event, the port may block transmission and reception of the service(s) having the lowest connectivity priority, so that those services not blocked can meet their levels of service guaranteed by their SLAs.

Ports may become oversubscribed, for example, due to the assumption that not all MP2MP service customers will use the maximum BW at all times. Even though the present invention allows a network to determine aggregate BW requirements of all MP2MP services at each port in the network, it is still possible that those requirements exceed the capacity of one or more LANs (links/segments) of the network. For instance, networks often employ an "oversubscription ratio" that assumes not all customers of the MP2MP services will exercise their maximum allowed BW rates at the same time. As a result, the network links may be configured to allocate a maximum amount of BW that is greater than the physical limit of the link in order to accommodate more MP2MP service registrations. For example, assume that a link may only be able to support 40 Mb/s. With an oversubscription ratio of, e.g., 1.25 (125%), however, a port may allocate up to 50 Mb/s of BW on the link (e.g., for a plurality of {service, priority, color, direction} types), such as, e.g., 25 Mb/s for one service, and 25 Mb/s for another, etc.

In the event the BW of a particular service exceeds its allocated BW on a port, the port may police/enforce the traffic of that particular service in a conventional manner (e.g., using color marking) as will be understood by those skilled in the art. In the event the overall BW of a link or port is exceeded due to multiple competing services (e.g., the two 25 Mb/s services on a 40 Mb/s link), overloading the link and applying conventional policing/enforcing techniques may result in none of the multiple competing/conflicting services meeting their SLA. For instance, policing/enforcing overloaded traffic in a conventional manner may result in traffic being discarded/suspended from all services. Also, a large number of spurious connectivity faults may be caused by dropped connectivity check messages, as will be understood by those skilled in the art.

In accordance with yet another aspect of the present invention, a connectivity priority may be assigned to each {service}, {service, priority}, and/or {service, priority, color} of the provider network 120, e.g., in each service's SLA. The connectivity priority is a value or set of values that defines a priority level of a particular service's traffic as compared to other services. For example, certain services may be more important than others (e.g., due to more valuable SLAs for the provider network), such as preferring large business accounts to small home accounts. Using conventional priority and color policing/enforcing, an excessive number of frames belonging to many services (e.g., all those operating at priority 4 and/or marked yellow, etc.) may be discarded, resulting in no service meeting its SLA. A connectivity priority, then, may be used so that a port can block transmission and/or reception of all frames of the services with the lowest connectivity priority, thus allowing services with a higher connectivity priority to meet their guaranteed SLAs.

The connectivity priority is a value that is not carried in each frame of the traffic as is the conventional priority and color values, but is instead a property of the service defined in the SLA. In normal operations, the operator of a provider network would not expect the connectivity priority to cause any frames to be discarded; the network would be constructed, the SLAs would be agreed upon, and the path taken by each service through the network would be selected so that, BW limits would not be exceeded on any ports. Furthermore, excess capacity on certain LANs would be provided so that even in the event of a failure of a LAN or a bridge, the network topology after the failure would still be able to meet all of the services' SLAs. However, if multiple failures occurred, or if the network is operated without sufficient excess BW to support failures, then a failure could cause the BW on a port to exceed its limits. In this case, the SLAs of those services that carry higher connectivity priority will still be met, while some services that carry lower connectivity priority will be interrupted.

Figure 10A:
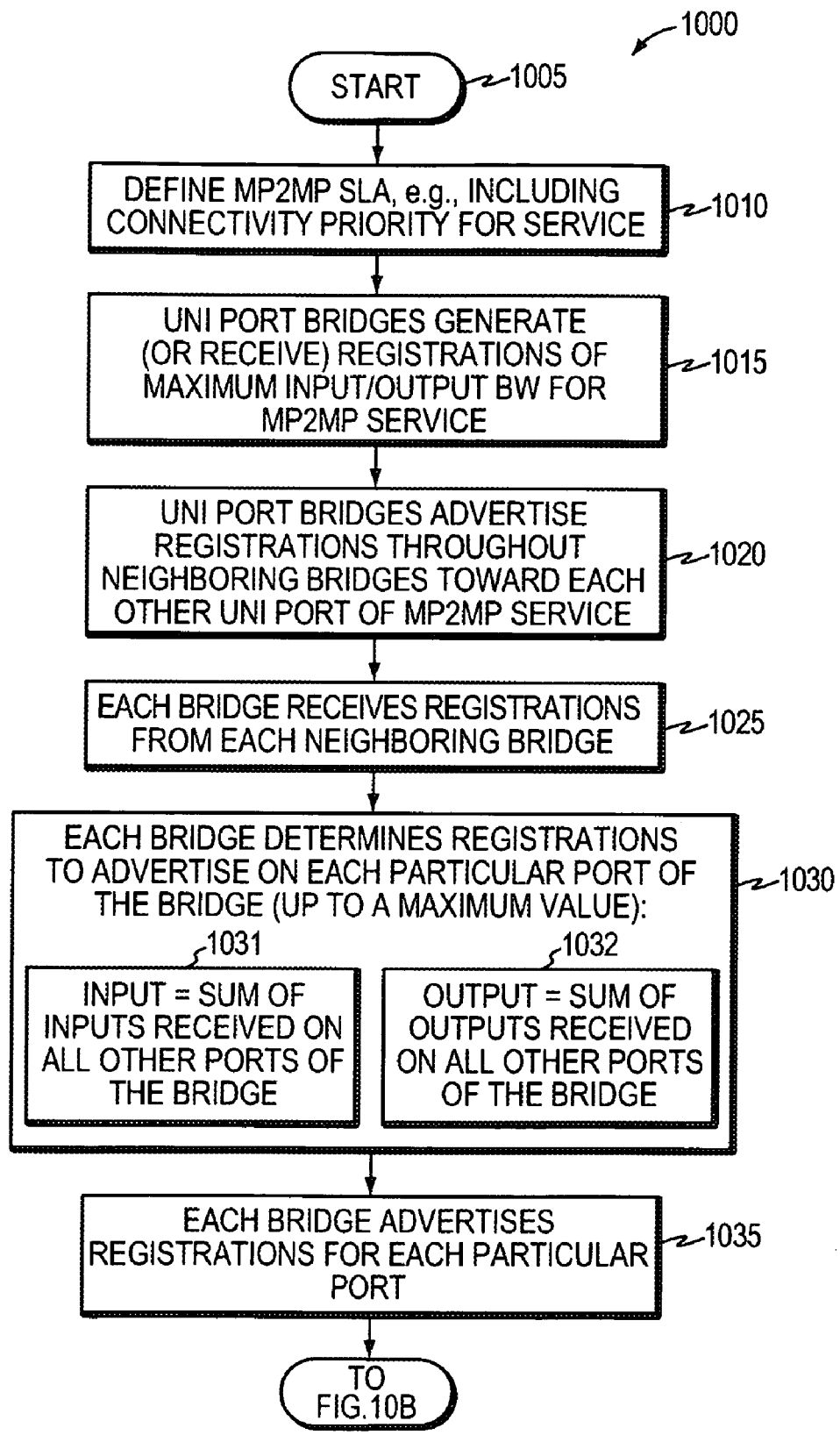
FIGS. 10A and 10B are flowcharts illustrating a procedure for efficiently managing BW for MP2MP services in a provider network in accordance with the present invention.
Figure 10B:
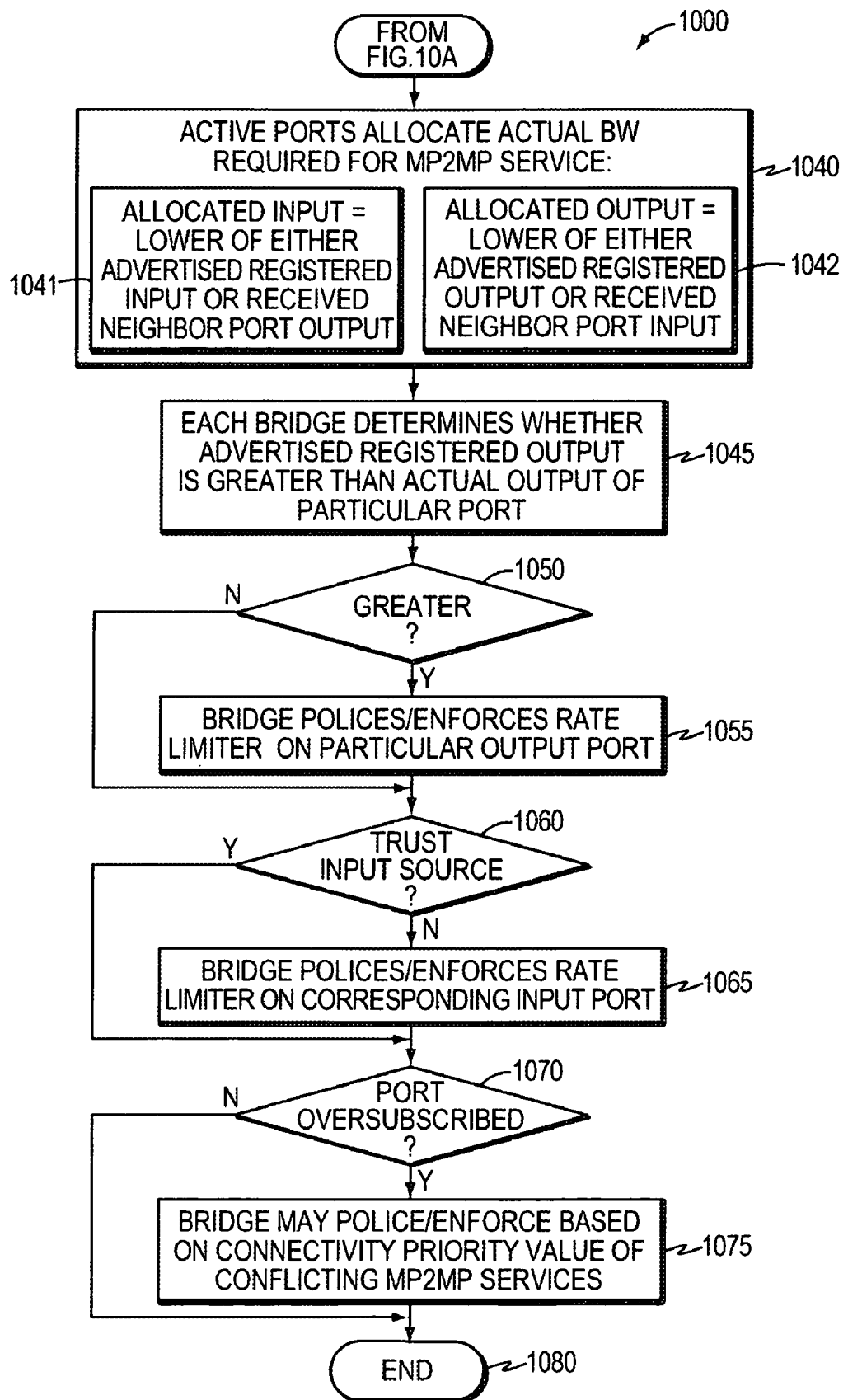

FIGS. 10A and 10B are flowcharts illustrating a procedure for efficiently managing BW for MP2MP services in a provider network in accordance with the present invention. The procedure 1000 starts at step 1005 and continues to step 1010, where an SLA may be defined for an MP2MP service, as described in detail above. Illustratively, the SLA may comprise one or more connectivity priorities for MP2MP services, as also described above. At step 1015, the UNI port bridges of the MP2MP service (e.g., bridges 104 attached to customer devices 102) generate registration messages 400 carrying the maximum input and output BW values for the MP2MP service (e.g., per each {service, priority, color} triple). As mentioned above, the UNI port bridges may generate registrations based on the SLA, or may generate registrations based on received registrations (e.g., from MP2MP service customers 102). At step 1020, the UNI port bridges advertise the registrations throughout the neighboring bridges toward each other UNI port of the is MP2MP service, such as based on a selected spanning tree (VLAN). To continue advertising registrations throughout the network, each bridge of the network receives registrations from each neighboring bridge in step 1025, and determines what registrations it should advertise on each of its particular ports in step 1030 (e.g., for each {service, priority, color, direction} tuple). Specifically, in sub-step 1031, the registered input BW advertised on a particular port is the sum of the registered inputs received on all other ports of the bridge (see examples above in FIGS. 5-7). Also, in sub-step 1032, the registered output BW advertised on a particular port is the sum of the registered outputs received on all other ports of the bridge (see FIG. 7). As described above, the input and output BW may only be registered up to a maximum value, e.g., configured or physical. Once the BW values are determined in step 1030, the bridge advertises the registrations (the BW values) for each particular port to the neighboring bridges in step 1035. Notably, steps 1025 through 1035 may be continually performed until each bridge of the network has received those advertisements regarding the MP2MP service.

The procedure 1000 continues to step 1040 of FIG. 10B, where active ports, i.e., those receiving registrations in both directions for the MP2MP service, allocate (reserve) the actual BW required for the service. Specifically, in sub-step 1041, the actual input BW allocated for the service is the lower value of either the advertised registered input BW for the port or the neighbor bridge's registered output received on that port. Also, in sub-step 1042, the actual output BW allocated for the service is the lower value of either the advertised registered output BW for the port or the neighbor bridge's registered input received on that port (for example, see FIG. 8). With the actual BW determined and allocated in step 1040, each bridge determines whether the advertised registered output BW for a port is greater than the actual output of that particular port in step 1045. If so in step 1050, the bridge may police/enforce a rate limiter on that particular output port in step 1055 (see FIG. 9). Also, if at step 1060 the bridge determines that it does not trust the input source of a port (e.g., a UNI port), the bridge may police/enforce a rate limiter on that input port in step 1065 (again, FIG. 9). Further, in accordance with the present invention, if during the operation of the MP2MP service a port becomes oversubscribed in step 1070, the bridge of that port may be configured to police/enforce the traffic over that port based on connectivity priority values of the conflicting MP2MP services in step 1075 (as described above). The procedure 1000 ends in step 1080.

Notably, the techniques described above in accordance with the present invention may be applied in real-time on actual network nodes, ports, etc., or may be simulated. Either application allows for the determination of "worst-case" BW requirements in each direction for any given MP2MP service on any given port in the provider network. Particularly, if applied as a simulation, the present invention may be used to configure reasonable BW limits on critical ports in the network, e.g., NNI ports (such as aggregation-to-backbone ports, as will be understood by those skilled in the art). If applied in real-time on the network, the present invention allows for the optimization of configured BW limits. Moreover, the present invention does not require knowledge (states) to be stored on bridges not directly on the spanning tree path between MP2MP end points, so the techniques may be sufficiently scalable for large networks accordingly.

Advantageously, the novel technique efficiently manages BW for MP2MP services in a provider network of a computer network. By calculating the maximum actual BW to be used at each port of the network, the novel technique allows for configured BW maximums to be "pushed back" into the network, thus alleviating excess wasted BW. In particular, the present invention allows for bridges of the network to effectively manage the BW for MP2MP services at each port, rather than sending excess BW to ports that are unable to handle such BW. Also, the novel technique provides the ability to effectively create and manage MP2MP SLAs, which may also account for the service provider network's topology. Further, the dynamic nature of the novel technique alleviates the need for cumbersome manual configuration.

While there has been shown and described an illustrative embodiment that efficiently manages BW for MP2MP services in a provider network of a computer network, it is to be understood that various other adaptations and modifications may be made within the spirit and scope of the present invention. For example, the invention has been shown and described herein using bridges and/or switches illustratively of an IEEE 802.1 network. However, the invention in its broader sense is not so limited, and may, in fact, be used with other Ethernet or Metro Area Networks (MANs), as will be understood by those skilled in the art. Moreover, while the above description describes performing the technique with various registration protocols (GARP, MRP, etc.), the present invention may equally utilize any suitable registration protocol, as will also be understood by those skilled in the art.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. An intermediate network device adapted to efficiently manage bandwidth (BW) for multipoint-to-multipoint (MP2MP) services in a provider network of a computer network, the device comprising:

two or more network ports having input and output port directions adapted to receive input traffic and transmit output traffic, the two or more ports further adapted to send and receive advertised registrations;

a processor coupled to the one or more ports and adapted to execute software processes; and a memory adapted to store a BW management process executable by the processor, the BW management process configured to:

i) receive registrations on at least one of the two or more ports from a neighbor bridge port, the received registrations having a maximum input BW value and a maximum output BW value for the neighbor port, ii) advertise registrations out at least one particular port of the two or more ports to corresponding neighbor bridge ports, the advertised registrations having a maximum input BW value for the particular port corresponding to a sum of maximum input BW values received from neighbor ports on ports other than the particular port, and a maximum output BW value for the particular port corresponding to a sum of maximum output BW values received from neighbor ports on ports other than the particular port, iii) determine whether a particular port is an active port of the MP2MP service, and iv) allocate actual input and output BW for the MP2MP service on active ports of the bridge, the allocated actual input BW being a lower one of either the advertised registered input BW value for the active port or the received registered output BW value from a corresponding neighbor port, and the allocated actual output BW being a lower one of either the advertised registered output BW value for the active port or the received registered input BW value from a corresponding neighbor port.

2. The device as in claim 1, wherein the registrations correspond to a particular MP2MP service, at a particular priority, of a particular color, in a particular direction.

3. The device as in claim 1, wherein the BW management process is further configured to:

determine whether the advertised registered output BW value for the active port is greater than the received registered input BW value from a corresponding neighbor port; and, in response police and enforce police and enforce output BW on the active port to meet the allocated actual output BW of the active port.

4. The device as in claim 1, wherein the BW management process is further configured to:

determine that a particular port is an active port of the MP2MP service based on the particular port receiving registrations from both directions.

5. The device as in claim 1, wherein the received registrations correspond to a service level agreement (SLA) for the MP2MP service.

6. The device as in claim 5, wherein the BW management process is further configured to:

receive registrations on at least one of the two or more ports from a customer device, the received registrations having a maximum input BW value and a maximum output BW value corresponding to the SLA.

7. The device as in claim 1, wherein the BW management process is further configured to:

limit the advertised maximum input BW value and output BW value to a configured maximum value for the particular port.

8. The device as in claim 7, wherein the configured maximum value for the particular port is a physical limitation of the port.

9. The device as in claim 7, wherein the BW management process is further configured to:

apply an oversubscription ratio to the configured maximum value for the particular port.

10. The device as in claim 1, wherein the device is a bridge.

11. A method for efficiently managing bandwidth (BW) for multipoint-to-multipoint (MP2MP) services in a provider network of a computer network, the method comprising:

receiving registrations on at least one of two or more ports of a bridge from a neighbor bridge port, the received registrations having a maximum input BW value and a maximum output BW value for the neighbor port;

advertising registrations out at least one particular port of the two or more ports to corresponding neighbor bridge ports, the advertised registrations having a maximum input BW value for the particular port corresponding to a sum of maximum input BW values received from neighbor ports on ports other than the particular port and a maximum output BW value for the particular port corresponding to a sum of maximum output BW values received from neighbor ports on ports other than the particular port;

determining whether a particular port is an active port of the MP2MP service; and allocating actual input and output BW for the MP2MP service on active ports of the bridge, the allocated actual input BW being a lower one of either the advertised registered input BW value for the active port or the received registered output BW value from a corresponding neighbor port, and the allocated actual output BW being a lower one of either the advertised registered output BW value for the active port or the received registered input BW value from a corresponding neighbor port.

12. An apparatus for efficiently managing bandwidth (BW) for multipoint-to-multipoint (MP2MP) services in a provider network of a computer network, the apparatus comprising:

means for receiving registrations on at least one of two or more ports of a bridge from a neighbor bridge port, the received registrations having a maximum input BW value and a maximum output BW value for the neighbor port;

means for advertising registrations out at least one particular port of the two or more ports to corresponding neighbor bridge ports, the advertised registrations having a maximum input BW value for the particular port corresponding to a sum of maximum input BW values received from neighbor ports on ports other than the particular port and a maximum output BW value for the particular port corresponding to a sum of maximum output BW values received from neighbor ports on ports other than the particular port;

means for determining whether a particular port is an active port of the MP2MP service; and means for allocating actual input and output BW for the MP2MP service on active ports of the bridge, the allocated actual input BW being a lower one of either the advertised registered input BW value for the active port or the received registered output BW value from a corresponding neighbor port, and the allocated actual output BW being a lower one of either the advertised registered output BW value for the active port or the received registered input BW value from a corresponding neighbor port.

13. A computer readable medium containing executable program instructions for efficiently managing bandwidth (BW) for multipoint-to-multipoint (MP2MP) services in a provider network in a computer network, the executable program instructions comprising program instructions for:

receiving registrations on at least one of two or more ports of a bridge from a neighbor bridge port, the received registrations having a maximum input BW value and a maximum output BW value for the neighbor port;

advertising registrations out at least one particular port of the two or more ports to corresponding neighbor bridge ports, the advertised registrations having a maximum input BW value for the particular port corresponding to a sum of maximum input BW values received from neighbor ports on ports other than the particular port and a maximum output BW value for the particular port corresponding to a sum of maximum output BW values received from neighbor ports on ports other than the particular port;

determining whether a particular port is an active port of the MP2MP service; and allocating actual input and output BW for the MP2MP service on active ports of the bridge, the allocated actual input BW being a lower one of either the advertised registered input BW value for the active port or the received registered output BW value from a corresponding neighbor port, and the allocated actual output BW being a lower one of either the advertised registered output BW value for the active port or the received registered input BW value from a corresponding neighbor port.

14. The method as in claim 11, further comprising:

determining whether the advertised registered output BW value for the active port is greater than the received registered input BW value from a corresponding neighbor port; and, in response policing and enforcing output BW on the active port to meet the allocated actual output BW of the active port.

15. The method as in claim 11, further comprising:

determining that a particular port is an active port of the MP2MP service based on the particular port receiving registrations from both directions.

16. The method as in claim 11, wherein the received registrations coffespond to a service level agreement (SLA) for the MP2MP service, the method further comprising:

receiving registrations on at least one of the two or more ports from a customer device, the received registrations having a maximum input BW value and a maximum output BW value corresponding to the SLA.

17. The method as in claim 11, further comprising:

limiting the advertised maximum input BW value and output BW value to a configured maximum value for the particular port.

18. The method as in claim 17, further comprising:

applying an oversubscription ratio to the configured maximum value for the particular port.

19. The method as in claim 11, wherein the registrations correspond to a particular MP2MP service, at a particular priority, of a particular color, in a particular direction.

* * * * *

UNITED STATES PATENT AND TRADEMARK OFFICE
CERTIFICATE OF CORRECTION

PATENT NO. : 7,515,535 B2  Page 1 of 1
APPLICATION NO. : 11/431429
DATED : April 7, 2009
INVENTOR(S) : Norman W. Finn It is certified that error appears in the above-identified patent and that said Letters Patent is hereby corrected as shown below:

Col. 6, Line 13, please amend as shown:
  the bridge ports used to reach end[[ is]] stations receiving frames Col. 12, Line 27, please amend as shown:
  forwarding state, and not just[[ is]] on the port at which the Col. 12, Line 67, please amend as shown:
  headquarters) may have an input BW[[ vakye if]] value of 30 MB/s ("30

Col. 13, Line 3, please amend as shown:
  skilled in[[ is]] the art will understand that while only one BW Col. 14, Line 17, please amend as shown:
  ports" and, thus, allocate (reserve) BW for the MP2MP[[ is]]

Col. 18, Line 6, please amend as shown:
  bridges toward each other UNI port of the[[ is]] MP2MP service, Col. 20, Line 32, please amend as shown:
  [[police and enforce ]]police and enforce output BW on the Col. 22, Line 41, please amend as shown:
  istrations[[ coffespond]] correspond to a service level agreement (SLA) for Signed and Sealed this Twelfth Day of October, 2010

David J. Kappos
*Director of the United States Patent and Trademark Office*